United States Patent
Johnson et al.

(10) Patent No.: US 12,272,388 B2
(45) Date of Patent: Apr. 8, 2025

(54) DATA STORAGE DEVICE WITH ADAPTIVE CONTROL OF CURRENT BALANCER TO MITIGATE ROTATIONAL VIBRATION (RV) NOISE

(71) Applicant: Western Digital Technologies, Inc., San Jose, CA (US)

(72) Inventors: Brian Johnson, Laguna Hills, CA (US); Peng Huang, Irvine, CA (US); Christopher B. Larsen, Cerritos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/447,959

(22) Filed: Aug. 10, 2023

(65) Prior Publication Data

US 2024/0249746 A1 Jul. 25, 2024

Related U.S. Application Data

(60) Provisional application No. 63/440,861, filed on Jan. 24, 2023.

(51) Int. Cl.
*G11B 5/48* (2006.01)
*G11B 5/596* (2006.01)

(52) U.S. Cl.
CPC ........ *G11B 5/4853* (2013.01); *G11B 5/59688* (2013.01)

(58) Field of Classification Search
None
See application file for complete search history.

(56) References Cited

U.S. PATENT DOCUMENTS 8,315,006 B1 11/2012 Chahwan et al.
8,924,641 B2 12/2014 Trantham et al.
(Continued)

FOREIGN PATENT DOCUMENTS

| CN | 1487504 A | 4/2004 |
| CN | 100447864 C | 12/2008 |
| WO | 2020096670 A1 | 5/2020 |

OTHER PUBLICATIONS

Qing Wei Jia, "Write Fault Protection Against Shock Disturbance in Hard Disk Drives Without a Shock Sensor", IEEE Transactions on Magnetics, Sep. 2007, pp. 3689-3693, vol. 43, No. 9.

*Primary Examiner* — William J Klimowicz
(74) *Attorney, Agent, or Firm* — NOD Law PC

(57) ABSTRACT

A data storage device comprises a disk; a head configured to read data from and write data to the disk; and a current balancer configured to receive a first voltage supply having a load limit and to receive a second voltage supply. The current balancer is further configured, to mitigate rotational vibration (RV) noise, to sample a first current $I_{H5V}$ drawn from the first voltage supply, to maintain a difference between the first current $I_{H5V}$ and a current balancer threshold parameter $I_{Threshold}$ to be at least twice a minimum peak current $minCurrentLimit_{pk}$ amount required for turn on of the current balancer ($I_{H5V} - I_{Threshold} \geq 2 \cdot minCurrentLimit_{pk}$), and to draw a second current from the second voltage supply to satisfy a part of a total load on the first voltage supply that exceeds the load limit.

22 Claims, 16 Drawing Sheets

(56) References Cited

U.S. PATENT DOCUMENTS

| | | | |
|---|---|---|---|
| 9,240,742 B1 | 1/2016 | Erickson et al. | |
| 9,245,577 B1 * | 1/2016 | Byoun | G11B 19/28 |
| 9,690,346 B1 | 6/2017 | Bucher | |
| 10,013,032 B1 * | 7/2018 | Ferris | G06F 1/189 |
| 10,459,502 B2 | 10/2019 | Massarotti et al. | |
| 10,714,133 B1 * | 7/2020 | Johnson | G11B 5/59688 |
| 2005/0114715 A1 * | 5/2005 | Sone | G06F 1/185 |
| | | | 713/300 |
| 2024/0096370 A1 * | 3/2024 | Johnson | G11B 21/08 |
| 2024/0203449 A1 * | 6/2024 | Contreras | G11B 5/012 |
| 2024/0248526 A1 * | 7/2024 | Johnson | G06F 1/3296 |

\* cited by examiner

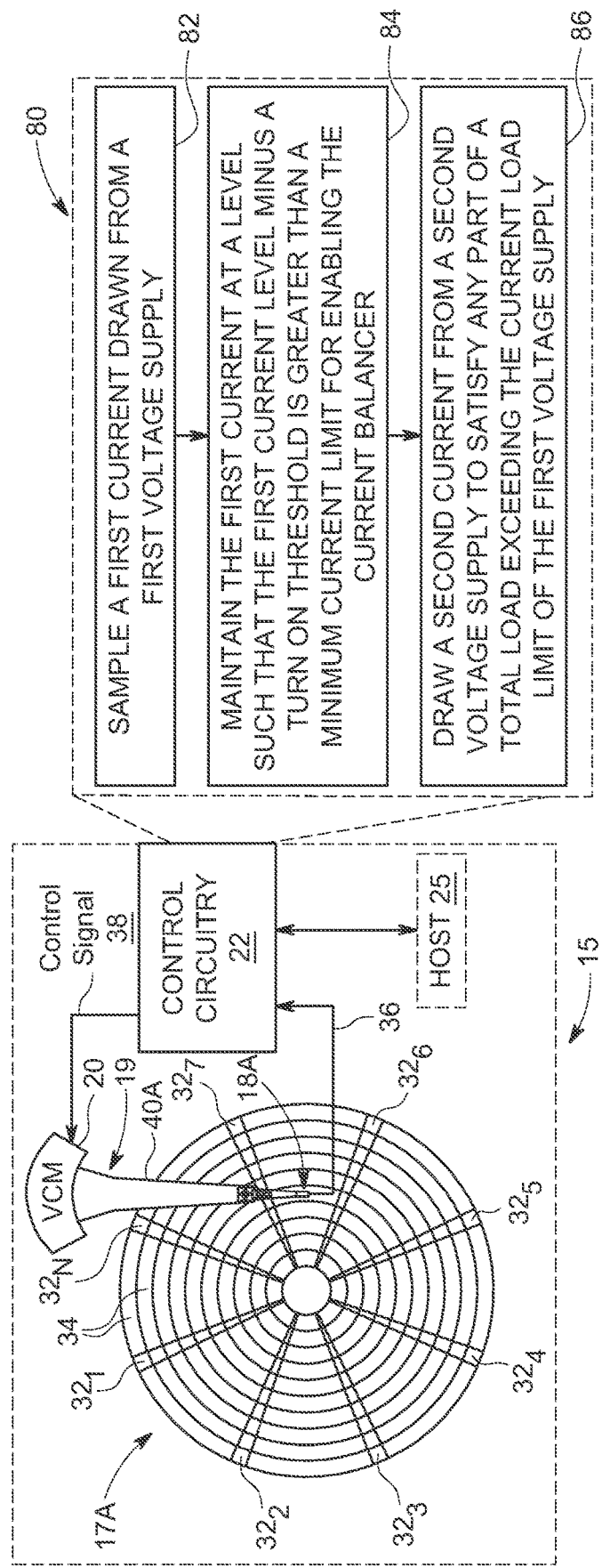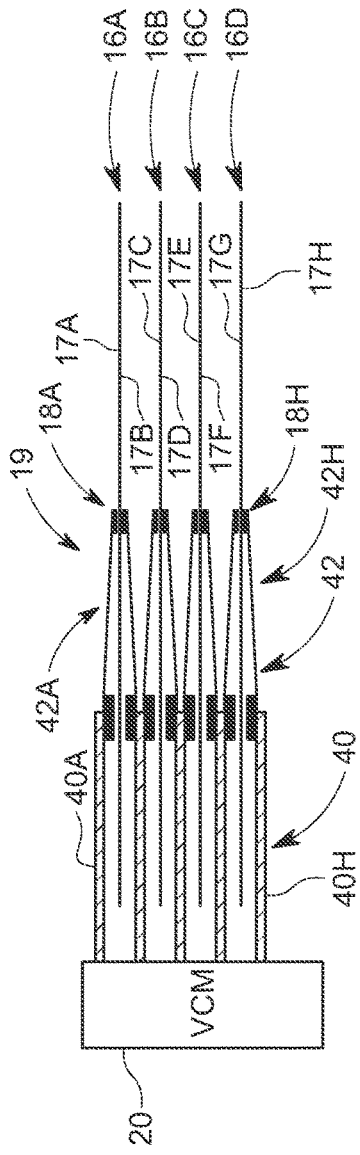
FIG. 2A
FIG. 2B
FIG. 2C

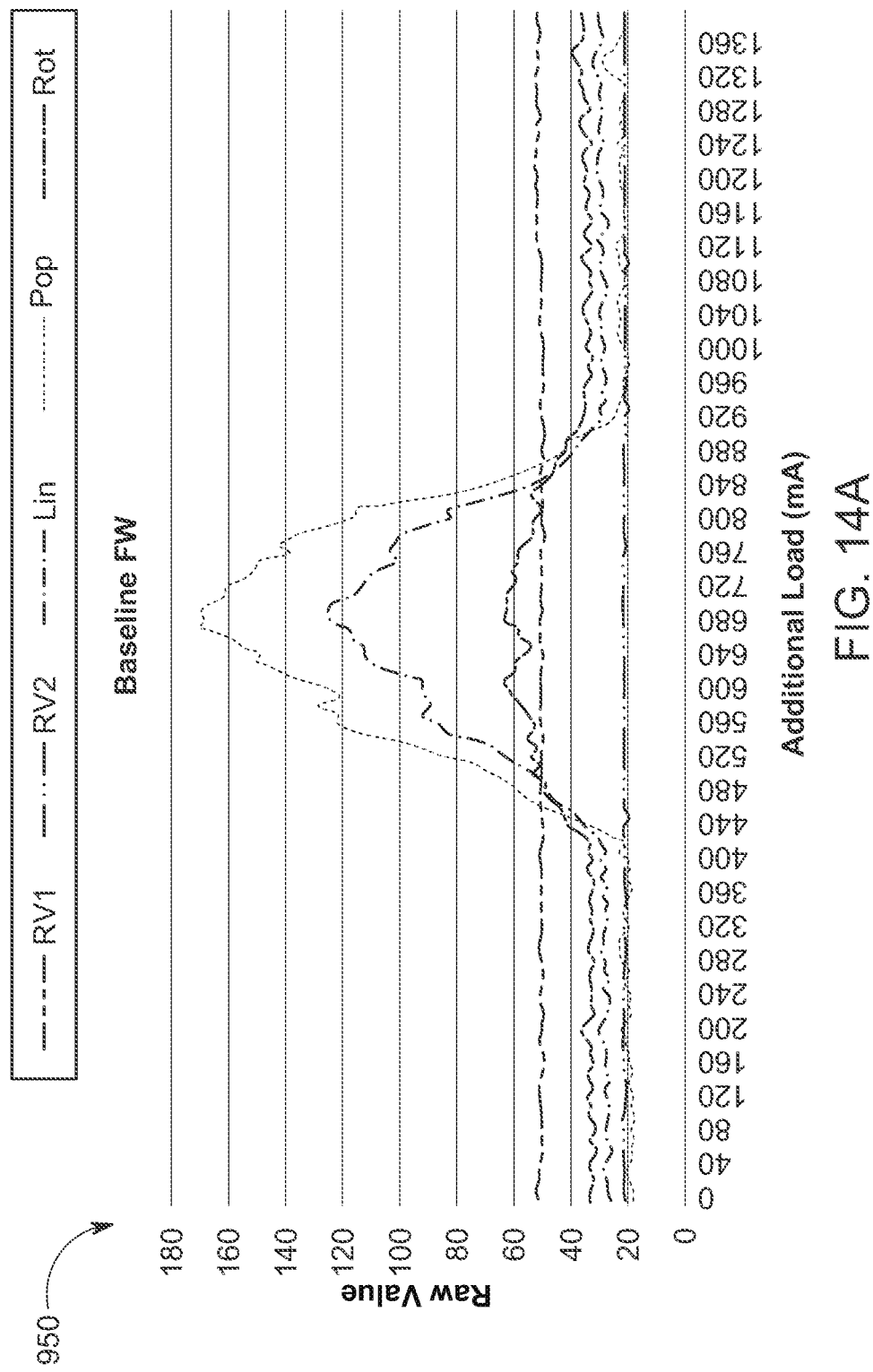

DATA STORAGE DEVICE WITH ADAPTIVE CONTROL OF CURRENT BALANCER TO MITIGATE ROTATIONAL VIBRATION (RV) NOISE

CLAIM OF PRIORITY UNDER 35 U.S.C. § 120

The present Application for Patent claims priority to Provisional Application No. 63/440,861 entitled "DATA STORAGE DEVICE WITH ADAPTIVE CONTROL OF CURRENT BALANCER TO MITIGATE ROTATIONAL VIBRATION (RV) NOISE" filed Jan. 24, 2023, and assigned to the assignee hereof and hereby expressly incorporated by reference herein.

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 is a conceptual diagram of a disk format 2 comprising multiple radially spaced and concentric servo tracks 4 defined by servo wedges $6_0$-$6_N$ recorded around the circumference of each servo track, in accordance with aspects of this disclosure. A plurality of concentric data tracks is defined relative to servo tracks 4, wherein the data tracks may have the same or a different radial density (e.g., tracks per inch (TPI)) relative to servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts) that are recorded with a predetermined phase relative to one another and relative to the servo track centerlines.

The coarse head positioning information is processed to position a head over a target data track during a seek operation, and servo bursts 14 provide fine head positioning information used for centerline tracking while accessing a data track during write/read operations. A position error signal (PES) is generated by reading servo bursts 14 and represents a measured position of the head relative to a centerline of a target servo track. The servo control system processes the PES to generate a control signal applied to the one or more actuators to actuate the head radially over the disk in a direction that reduces the PES.

The description provided in this background section should not be assumed to be prior art merely because it is mentioned in or associated with this background section. This background section may include information that describes one or more aspects of the subject technology.

SUMMARY

The following summary relates to one or more aspects and/or embodiments disclosed herein. It should not be considered as an extensive overview relating to all contemplated aspects and/or embodiments and should not be regarded as identifying key or critical elements relating to all contemplated aspects and/or embodiments or as delineating the scope associated with any aspect and/or embodiment. Accordingly, the following summary has the sole purpose of presenting certain concepts relating to one or more aspects and/or embodiments disclosed herein in a simplified form to precede the detailed description presented below.

Multiple internal voltage levels or supplies may be used to power various components in a disk drive. A low voltage supply (in the range of 5V, for example) may be provided to power circuits and components within the disk drive with lower voltage requirements, and a high voltage supply (in the range of 12V, for example) may be provided to power components with higher voltage requirements such as the spindle motor. The low and high voltage levels may be supplied by a host power supply residing in a computing device, for example. In some instances, limits may exist on the current loads that can be placed on one or more of the internal voltage supplies. A host current limit may be set on the low voltage power supply, for example. Nevertheless, the total current load placed on the low voltage supply may exceed the host current limit. To avoid exceeding the host current limit, the amount by which the total load exceeds the host current limit must be supplied by a source other than the low voltage supply.

Various illustrative aspects are directed to a data storage device comprising a disk; a head configured to read data from and write data to the disk; and a current balancer configured to: receive a first voltage supply having a load limit, receive a second voltage supply, sample a first current drawn from the first voltage supply, maintain a difference between the first current and a current balancer threshold parameter, wherein the difference is based on a minimum peak current amount required to turn on the current balancer, and draw a second current from the second voltage supply to satisfy a part of a total load on the first voltage supply that exceeds the load limit.

In some implementations, the difference is at least a scalar multiple of the minimum peak current amount.

In some implementations, the difference is at least twice the minimum peak current amount.

In some implementations, the data storage device further comprises a circuit protection device that is configured to be coupled to the first and second voltage supplies. The circuit protection device comprises a current sensor configured to sense the first current drawn from the first voltage supply.

In some implementations, the data storage device further comprises an analog-to-digital converter (ADC) that is coupled to the current sensor and that is configured to sample the first current sensed by the current sensor; and a system-on-a-chip (SoC) that is coupled to the ADC, that is configured to receive the sampled first current from the ADC, and that is configured to control the current balancer based on the sampled first current.

In some implementations, the SoC is configured to generate the current balancer threshold parameter and a current balancer gain parameter based on the sampled first current received from the ADC.

In some implementations, the SoC is configured to enable the current balancer only when the difference between the first current $I_{H5V}$ and the current balancer threshold parameter $I_{Threshold}$ is at least twice the minimum peak current minCurrentLimit$_{pk}$ amount required for turn on of the current balancer ($I_{H5V}$−$I_{Threshold}$≥2*minCurrentLimit$_{pk}$).

In some implementations, the current balancer further comprises registers that are coupled to the SoC and that are configured to receive and store the current balancer threshold and gain parameters from the SoC. The ADC may be configured to periodically update the sampled first current that is provided to the SoC, and the SoC may be configured to periodically update the current balancer threshold and gain parameters.

In some implementations, the SoC is configured to read the sampled first current from the ADC via a serial port following a first servo ID, and the SoC is configured to write the current balancer threshold and gain parameters to the registers following a second servo ID that is consecutive to the first servo ID.

In some implementations, where DSR $I_{pk}$ is the second current drawn by the current balancer from the second voltage supply, and Gain is the current balancer gain parameter, the second current may be represented by:

$$DSR\ I_{pk}=((I_{H5V}-I_{Threshold})\times Gain)+minCurrentLimit_{pk}.$$

In some implementations, the SoC is configured to disable the current balancer only after the sampled first current falls below a turn off threshold of the current balancer, and only after the sampled first current remains below the turn off threshold for a predetermined deglitch delay. In some implementations, the deglitch delay comprises 5000 servo IDs. In other implementations, the deglitch delay comprises 1000 servo IDs.

Various illustrative aspects are also directed to a method for mitigating rotational vibration (RV) noise in a current balancer of a data storage device configured to receive a first voltage supply having a load limit and a second voltage supply. The method comprises sampling a first current $I_{H5V}$ drawn from the first voltage supply; maintaining a difference between the first current $I_{H5V}$ and a current balancer threshold parameter $I_{Threshold}$ to be at least twice a minimum peak current minCurrentLimit$_{pk}$ amount required for turn on of the current balancer ($I_{H5V}$−$I_{Threshold}$≥2*minCurrentLimit$_{pk}$); and drawing a second current from the second voltage supply to satisfy a part of a total load on the first voltage supply that exceeds the load limit.

In some implementations, the method further comprises sensing the first current by a current sensor in a circuit protection device; sampling the sensed first current by an analog-to-digital converter (ADC); reading the sampled first current by a system-on-a-chip (SoC) via a serial port from the ADC; and writing the current balancer threshold parameter and a current balancer gain parameter by the SoC via the serial port to a current balancer register.

In some implementations, the method further comprises reading the sampled first current by the SoC via the serial port following a first servo ID; and writing the current balancer threshold and gain parameters via the serial port following a second servo ID that is consecutive to the first servo ID.

In some implementations, the method further comprises enabling the current balancer only when the difference between the first current $I_{H5V}$ and the current balancer threshold parameter $I_{Threshold}$ is at least twice the minimum peak current minCurrentLimit$_{pk}$ ($I_{H5V}$−$I_{Threshold}$≥2*minCurrentLimit$_{pk}$).

In some implementations, the method further comprises disabling the current balancer only when the sampled first current remains below a turn off threshold of the current balancer for a predetermined deglitch delay.

Various illustrative aspects are further directed to one or more processing devices for mitigating rotational vibration (RV) noise in a current balancer of a data storage device. The one or more processing devices comprise means for receiving a first voltage supply having a load limit; means for receiving a second voltage supply; means for sampling a first current $I_{H5V}$ drawn from the first voltage supply; means for maintaining a difference between the first current $I_{H5V}$ and a current balancer threshold parameter $I_{Threshold}$ to be at least twice a minimum peak current minCurrentLimit$_{pk}$ amount required for turn on of the current balancer ($I_{H5V}$−$I_{Threshold}$>2*minCurrentLimit$_{pk}$); and means for drawing a second current from the second voltage supply to satisfy a part of a total first voltage supply load that exceeds the load limit.

In some implementations, the one or more processing devices further comprise means for enabling the current balancer only when the difference between the first current $I_{H5V}$ and the current balancer threshold parameter $I_{Threshold}$ is at least twice the minimum peak current minCurrentLimit$_{pk}$ amount ($I_{H5V}$−$I_{Threshold}$>2*minCurrentLimit$_{pk}$).

In some implementations, the one or more processing devices further comprise means for disabling the current balancer only when the sampled first current remains below a turn off threshold of the current balancer for a predetermined deglitch delay.

Various further aspects are depicted in the accompanying figures and described below and will be apparent based thereon.

BRIEF DESCRIPTION OF THE DRAWINGS

Various features and advantages of the technology of this disclosure will be apparent from the following description of examples of those technologies and from the accompanying drawings. The drawings are not necessarily to scale; emphasis instead is placed on illustrating the principles of the technological concepts. In the drawings, like reference characters may refer to the same parts throughout the different views. The drawings depict only illustrative examples of this disclosure and are not limiting in scope.

FIG. 2A is a conceptual diagram of a top view of a data storage device in the form of a disk drive, in accordance with aspects of this disclosure.

FIG. 2B is a conceptual diagram of a side view of a data storage device in the form of a disk drive, in accordance with aspects of this disclosure.

FIG. 2C is a flow diagram of a method that control circuitry of a data storage device may perform, in accordance with aspects of this disclosure.

FIG. 14A is a graph plotting RV noise versus load for a baseline firmware configuration, in accordance with aspects of this disclosure.

DETAILED DESCRIPTION

Figure 1:
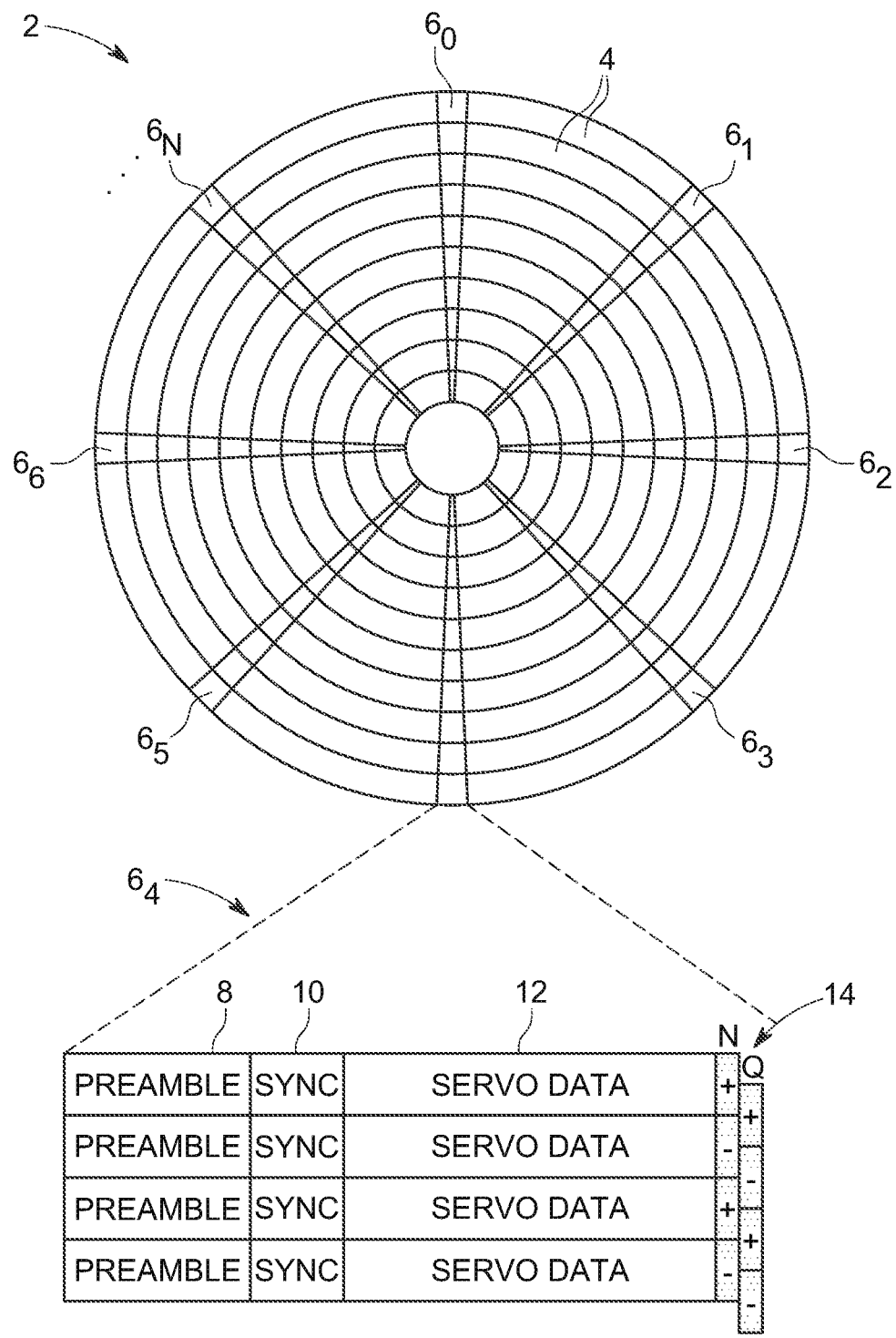
FIG. 1 is a conceptual diagram of a disk format comprising multiple radially spaced and concentric servo tracks defined by servo wedges recorded around the circumference of each servo track, in accordance with aspects of this disclosure.

The word "exemplary" is used herein to mean "serving as an example, instance, or illustration." Embodiments described herein as "exemplary" should not be construed as being preferred or advantageous over other embodiments.

The embodiments described herein are not intended to limit the invention to the precise form disclosed or to be exhaustive. Rather, the embodiments are presented to provide a description so that others skilled in the art may utilize their teachings. Technology continues to develop, and aspects of the embodiments described herein may be replaced by improved and enhanced aspects. Moreover, this disclosure inherently discloses aspects of embodiments incorporating technology available at the time of this disclosure.

FIGS. 2A and 2B are conceptual diagrams of top and side views of a data storage device in the form of a disk drive 15, in accordance with aspects of this disclosure. Disk drive 15 comprises control circuitry 22, actuator assembly 19, and hard disks 16 (16A . . . 16D). FIG. 2C is a flow diagram of a method 80 that control circuitry 22 of disk drive 15 may perform in accordance with aspects of this disclosure, as further described below.

Actuator assembly 19 is configured to position heads 18 (18A . . . 18H) over disk surfaces 17 (17A . . . 17H) of disks 16. Heads 18 comprise write and read elements configured to write and read control features and data to and from corresponding disk surfaces 17 of disks 16. Actuator assembly 19 comprises primary actuator (VCM) 20, actuator arms 40 (40A . . . 40E), and suspensions 42 (42A . . . 42H). Heads 18 are configured at distal ends of suspensions 42 and are suspended in close proximity over corresponding disk surfaces 17. The examples shown in FIGS. 2A and 2B are for non-limiting purposes of illustration only; any of a wide variety of other numbers of actuator assemblies, actuator arms, suspensions, heads, disks, and disk surfaces may be employed.

FIG. 2A also depicts servo sectors 32 ($32_1$ . . . $32_N$) written onto disk surfaces 17. When manufacturing disk drive 15, servo sectors 32 may be written to disk surfaces 17 to define evenly spaced, concentric tracks 34. Each servo sector 32 may include, for example, a phase locked loop (PLL) field, a servo identification field (SID), a servo sync mark (SSM) field, a track identification (TKID) field, a sector ID, and a group of servo bursts (e.g., an alternating pattern of magnetic transitions) that the servo system of disk drive 15 samples to align head 18 with, and relative to, a particular track 34. Servo sectors 32 are spaced sequentially around a circumferential track 34 and extend radially outward from the inner diameter (ID) of disk surface 17. Servo sectors 32 contain servo information utilized in seeking and track following and are interspersed between data regions on disk surfaces 17. Data is conventionally written in the data regions in a plurality of discrete data sectors, and each data region is typically preceded by a servo sector 32.

In disk drive 15, multiple internal voltage levels or supplies are used to power various components in the disk drive. A first power supply (in some examples, a relatively low power supply in the range of 5V) may be provided to power circuits and components within disk drive 15 having first (typically lower) voltage requirements, and a second power supply (in some examples, a relatively high voltage supply in the range of 12V) may be provided to power components with second (typically higher) voltage requirements such as the spindle motor. The first or low voltage supply is sometimes referred to as the 5V or "D5V" rail, and the second or high voltage supply is sometimes referred to as the 12V or "D12V" rail. The low and high voltage supplies may be provided by a host power supply residing in a host 25, for example. Host 25 may be a computing device such as a desktop computer, a laptop, a server, a mobile computing device (e.g., smartphone, tablet, Netbook, to name a few non-limiting examples), or any other suitable computing device. Alternatively, host 25 may be a test computer that performs calibration and testing functions during the disk drive manufacturing process.

In some instances, limits may exist on current loads that can be placed on one or more of the internal voltage supplies. With respect to the low voltage (5V) supply, for example, a host current limit may be set by host 25. In one non-limiting example, the host current limit of the low voltage supply may be 1.5A. Nevertheless, the total current load placed on the low voltage supply ("total low voltage supply load") may exceed the host current limit. For example, where the host current limit for the low voltage supply is 1.5A, the total low voltage supply load may be higher, such as 2A. In this example, the amount by which the total low voltage supply load exceeds the host current limit (0.5A) must be supplied by a source other than the low voltage supply, since the low voltage supply cannot support a load higher than the host current limit.

Current balancer 300, which is described in more detail below, is provided for regulating the host current drawn from the low voltage (5V) supply so as not to exceed the host current limit, and for supplying any part of the total low voltage supply load that exceeds the host current limit from the high voltage (12V) supply. Because the drive shutdown regulator (DSR) of the current balancer, which draws any needed current from the high voltage supply, requires a minimum DSR peak current (current drawn from the high voltage supply) for turn on (typically about 0.7A), when the DSR current is in the region of this minimum turn on amount, a region of discontinuity and RV (rotational vibration) noise is observed. In accordance with aspects of this disclosure, control circuitry 22 is configured to perform a method 80 as shown in FIG. 2C for mitigating RV noise while operating current balancer 300. Control circuitry 22 may comprise one or more processing devices for performing method 80 such as, for example, current balancer 300 of FIG. 3 and its constituent components. In step 82, a first (host) current drawn from a first (low) voltage supply is sampled. In step 84, the first (host) current is maintained such that a difference between the first (host) current minus a threshold is at least twice the minimum peak current limit for enabling (turning on) the current balancer. In step 86, a second (DSR) current is drawn from a second (high) voltage supply to satisfy the part of the total first voltage supply load that exceeds a load limit of the first voltage supply.

In the following description, for ease of reference to those of skill in the art, the first voltage supply may be referred to as a low voltage or 5V supply or rail, and the second voltage supply may be referred to as a high voltage or 12V supply or rail. These values and ranges are merely exemplary, however, and this disclosure is not limited to power supplies having those values or ranges. Likewise, while various current, voltage and power values, ranges, limits, and the like are discussed herein for sake of illustration, this disclosure is not limited to any such values, ranges, limits and the like.

Figure 3:
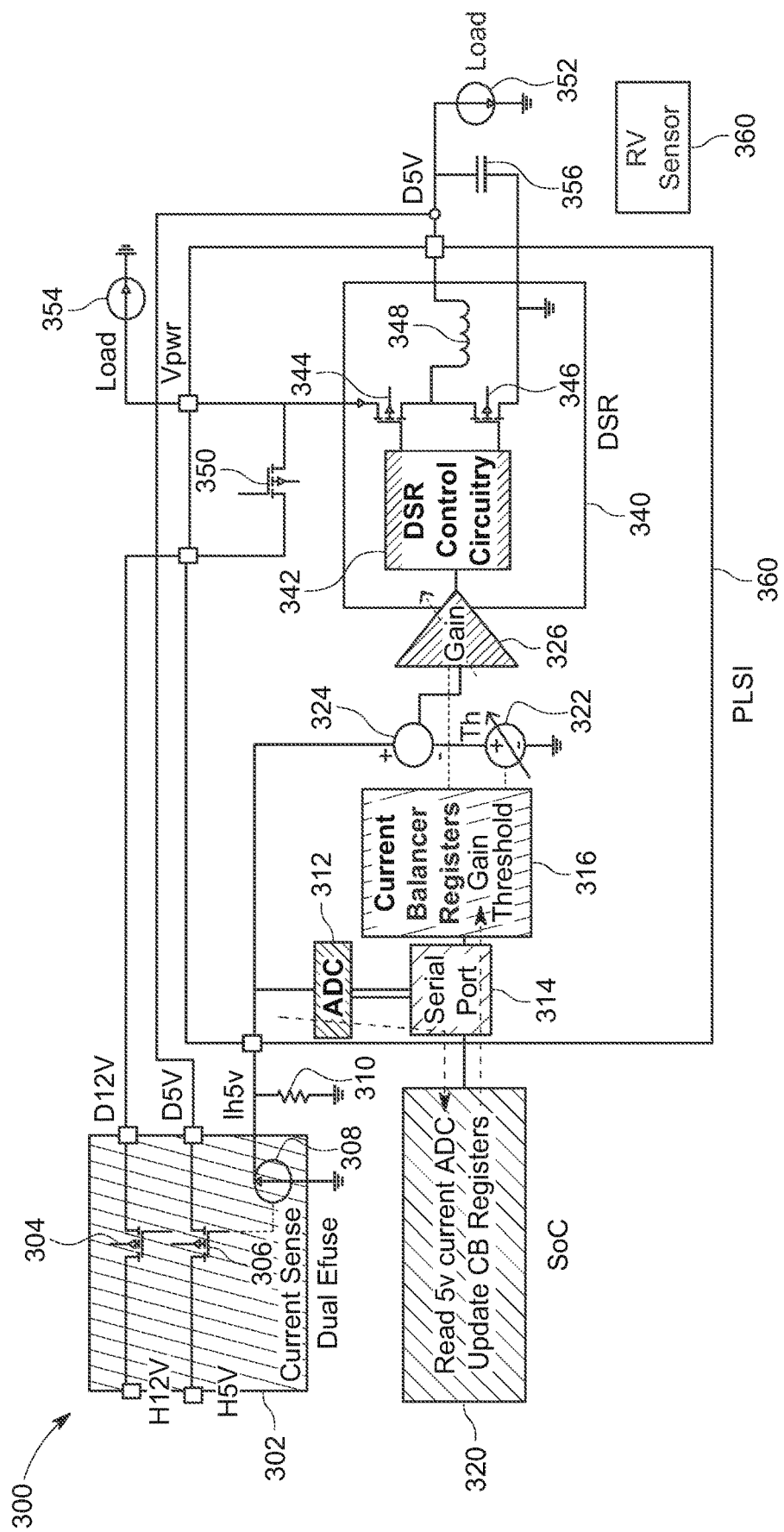
FIG. 3 is a conceptual diagram of one or more processing devices including a current balancer (CB), in accordance with aspects of this disclosure.

FIG. 3 is a conceptual block diagram of one or more processing devices including a current balancer (CB) 300, in accordance with aspects of this disclosure. Current balancer 300 is configured to regulate the host current drawn from the low voltage (5V) supply in a manner that reduces or minimizes power consumption. Current balancer 300 monitors the host current drawn from the low voltage supply that flows through circuit protection device 302. When the total low voltage supply load (e.g., load 352) exceeds the host current limit, system-on-a-chip (SoC) 320 controls drive shutdown regulator (DSR) 340 of current balancer 300 to supply the part of the total low voltage supply load that exceeds the host current limit. In one example, SoC 320 controls DSR 340 via firmware implemented on SoC 320.

DSR 340 is a regulator that, in a drive shutdown application, is operative when power is off (drive shutdown) to pull power generated from spindle back electromotive force (BEMF) via the high voltage rail to the low voltage rail. According to this disclosure, in addition to this drive shutdown application, DSR 340 is controlled to draw current from the high voltage supply to satisfy the part of the total low voltage supply load that exceeds the host current limit. Thus, current balancer 300 balances the current drawn from the low and high voltage supplies such that the current drawn from the low voltage supply does not exceed the host current limit. As described below, current balancer 300 carries out this task in a manner to reduce rotational vibration (RV) noise caused by DSR 340 switching on and off in a region of discontinuity.

In one implementation, circuit protection device 302 is a dual efuse device that protects the circuits and components within disk drive 15 from overcurrent or overvoltage conditions on loads supported by the high voltage (D12V) and low voltage (D5V) supply rails. Circuit protection device 302 automatically interrupts the flow of current when current or voltage exceeds a certain level. As can be seen in FIG. 3, circuit protection device 302 includes a first switching element 304 interposed between a high voltage input (H12V) and a high voltage output (D12V) and a second switching element 306 interposed between a low voltage input (H5V) and a low voltage output (D5V). Switching elements 304 and 306 are typically transistors such as MOSFETs (metal-oxide-semiconductor field-effect transistors) that can be switched on or off to allow or interrupt the flow of current as needed. Circuit protection device 302 also includes current sensors or monitors that sense the high and low voltage currents flowing through device 302, including current sensor or monitor 308 that senses the low voltage supply host current $I_{H5V}$ flowing through circuit protection device 302.

The peak current DSR $I_{pk}$ (second current) drawn by DSR 340 from the high voltage supply (second voltage supply) is represented by the following linear equation (1):

$$\text{DSR Limit}_{pk} I_{pk} = ((I_{H5V} - I_{Threshold}) \times \text{Gain}) + \text{minCurrent}$$

In equation (1), DSR $I_{pk}$ is the peak current (second current) in amps drawn by DSR 340 from the high voltage supply (second voltage supply); $I_{H5V}$ is the low voltage supply host current (first current) flowing through circuit protection device 302 as converted to a voltage value by resistor 310 and sampled by ADC 312; $I_{Threshold}$ is a CB threshold voltage parameter (in volts) set by SoC 320; Gain is a CB gain parameter set by SoC 320; and minCurrentLimit$_{pk}$ is a minimum current limit (peak value from a triangle wave) required for turn on of DSR 340 (typically about 0.7A peak, or about 0.35A average). The CB threshold voltage ($I_{Threshold}$) and gain (Gain) parameters are set by SoC 320 to regulate the low voltage supply host current $I_{H5V}$ to be at or below the host current limit.

As can be seen in FIG. 3, the low voltage supply host current $I_{H5V}$ sensed by current sensor 308 is converted to a voltage value $I_{H5V}(v)$ by resistor 310, which in turn is periodically sampled by analog-to-digital converter (ADC) 312 and provided to SoC 320 via serial port 314. Based on this sampling of the host current $I_{H5V}(v)$ provided by ADC 312, SoC 320 sets the CB threshold voltage parameter $I_{Threshold}$ and the CB gain parameter Gain so as to regulate the low voltage supply host current $I_{H5V}$ to be at or below the host current limit. As described below, the host current is maintained at a target host current level that is equal to the host current limit minus a small margin. SoC 320 provides the CB threshold voltage and gain parameters via serial port 314 to CB registers 316. The CB threshold voltage parameter $I_{Threshold}$ stored in registers 316 sets the value of threshold voltage supply 322, which is then subtracted from the sampled host current $I_{H5V}$ (as converted to voltage) at 324 and multiplied by gain element 326 as set by the CB gain parameter Gain stored in registers 316. The resultant output $(I_{H5v}-I_{Threshold}) \times \text{Gain}$ of element 326 is input to control circuitry 342 of DSR 340.

DSR 340 includes control circuitry 342, switching elements 344 and 346 (MOSFETs, for example), and inductor 348 through which the DSR current flows (i.e., the current pulled from the high voltage supply by DSR 340). DSR control circuitry 342 controls the current flow through switching elements 344, 346 as needed to adjust the DSR current. In particular, DSR 340 draws any current above the host current limit that is needed to support the total low voltage supply load 352 from the high voltage supply D12V via switching element 350. Current balancer 300 includes output capacitor(s) 356 across which the D5V voltage is output to load 352. The high voltage supply D12V also supplies current to its own high voltage supply load 354. Disk drive 15 also includes a rotational vibration (RV) sensor 360 that is mounted in close proximity to output capacitor(s) 356, as will be described in more detail herein.

As can be seen in FIG. 3, in one example, many elements of current balancer 300 are implemented on PLSI (power large scale integration) circuit 360. In particular, ADC 312, serial port 314, CB registers 316, elements 322, 324, and 326, DSR 340 and its component elements, and switching element 350 may be implemented on PLSI circuit 360.

Figure 4A:
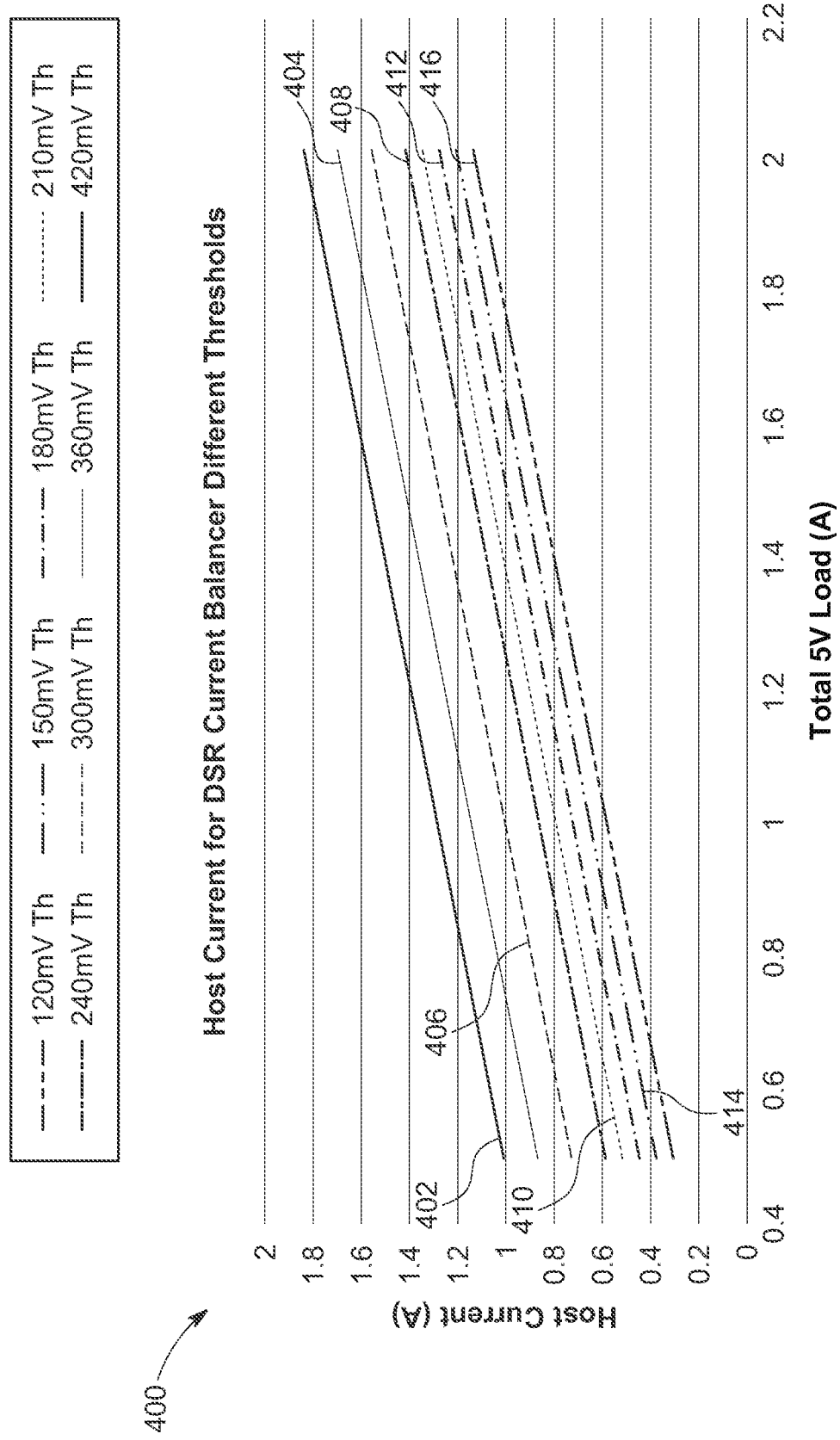
FIG. 4A is a graph plotting host current (vertical axis) versus total low voltage supply load (horizontal axis) for multiple CB threshold voltage parameter settings, in accordance with aspects of this disclosure.

FIG. 4A is a graph 400 plotting host current (vertical axis) versus total low voltage supply load (horizontal axis) for multiple CB threshold voltage parameter settings, with a maximum total low voltage supply load of 2A. In the non-limiting example of FIG. 4A, $I_{Threshold}$=420 mV for plot line 402; $I_{Threshold}$=360 mV for plot line 404; $I_{Threshold}$=300 mV for plot line 406; $I_{Threshold}$=240 mV for plot line 408; $I_{Threshold}$=210 mV for plot line 410; $I_{Threshold}$=180 mV for plot line 412; $I_{Threshold}$=150 mV for plot line 414; and $I_{Threshold}$=120 mV for plot line 416. The CB threshold voltage parameter settings depicted in FIG. 4A are for non-limiting purposes of illustration only; many other suitable threshold voltage parameter settings could alternatively be used. As can be seen in FIG. 4A, as $I_{Threshold}$ is lowered, host current $I_{H5V}$ is lowered, and as $I_{Threshold}$ is increased, host current $I_{H5V}$ is increased. Thus, the host current level can be set and changed by manipulating the CB threshold voltage parameter $I_{Threshold}$ settings.

Figure 4B:
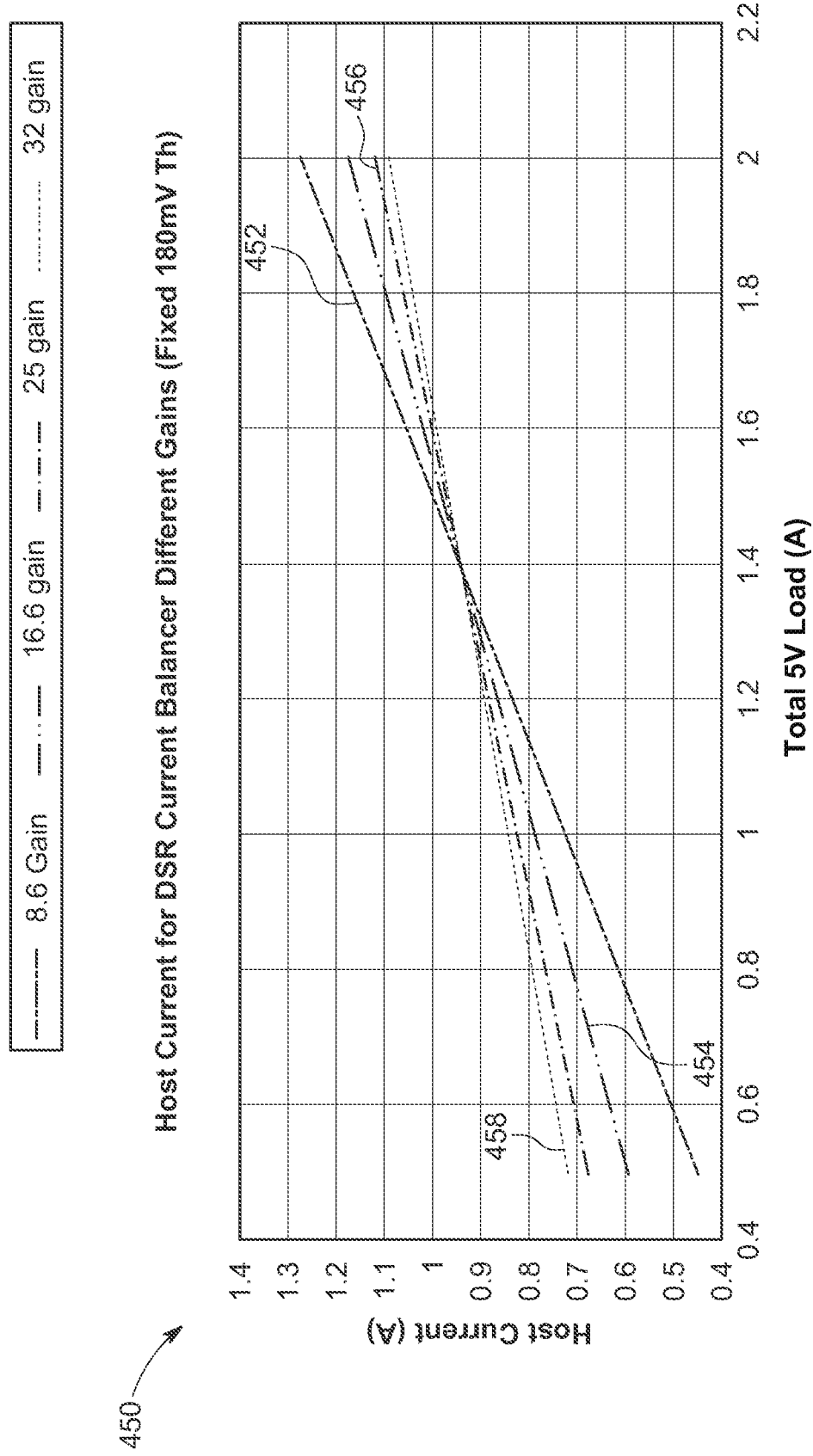
FIG. 4B is a graph plotting host current (vertical axis) versus total low voltage supply load (horizontal axis) for multiple CB gain parameter settings, in accordance with aspects of this disclosure.

FIG. 4B is a graph 450 plotting host current (vertical axis) versus total low voltage supply load (horizontal axis) for multiple CB gain parameter settings, with a maximum total low voltage supply load of 2A, and with a fixed $I_{Threshold}$=180 mV. In the non-limiting example of FIG. 4B, Gain=8.6 for plot line 452; Gain=16.6 for plot line 454; Gain=25 for plot line 456; and Gain=32 for plot line 458. The CB gain parameter settings depicted in FIG. 4B are for non-limiting purposes of illustration only; many other suitable CB gain parameter settings could alternatively be used. As can be seen in FIG. 4B, at higher Gain parameter settings, the host current increases at a lesser rate as the total load increases, and at lower Gain parameter settings, the host current increases at a greater rate as the total load increases. Thus, the host current level is also impacted by manipulating the CB gain parameter settings, in combination with manipulation of the CB threshold voltage parameter settings.

Figure 5:
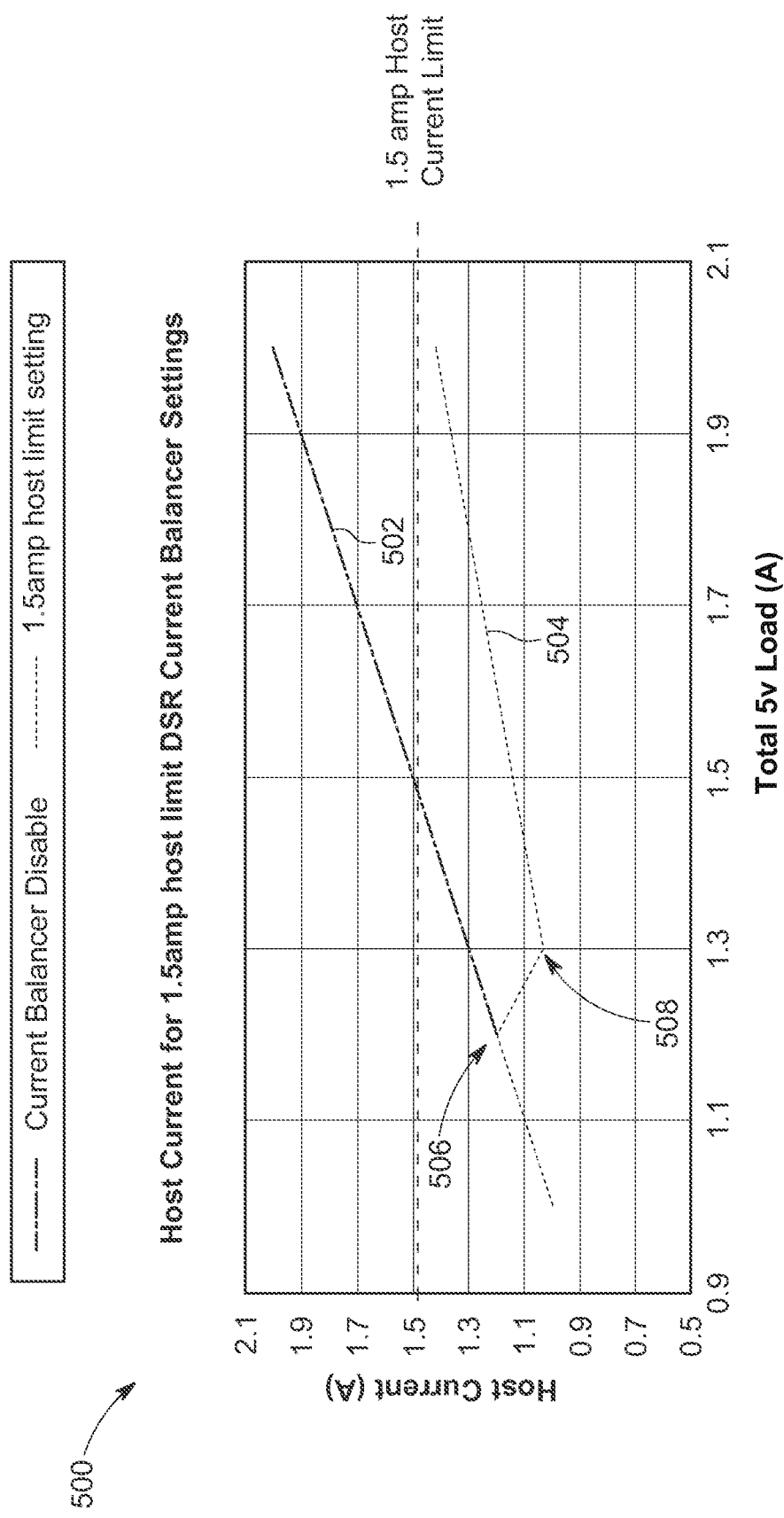
FIG. 5 is a is a graph plotting host current (vertical axis) versus total low voltage supply load (horizontal axis) for a CB disabled setting and for a CB baseline setting, in accordance with aspects of this disclosure.

FIG. 5 is a graph 500 plotting host current (vertical axis) versus total low voltage supply load (horizontal axis) when the current balancer is disabled (CB disabled setting) and for a CB baseline setting. In the non-limiting example of FIG. 5, there is a 1.5A host current limit and a maximum total low voltage supply load of 2A. Plot line 502 depicts host current versus the total 5V load for the CB disabled setting (i.e., DSR 340 is turned off). In the CB disabled setting, DSR 340 is turned off and does not draw any current from the high voltage supply. The host current therefore supports and is equal to the total 5V load at all points along line 502. Consequently, in the CB disabled setting, once the total 5V load exceeds the host current limit, the host current also exceeds the host current limit.

Plot line 504 of FIG. 5 illustrates a CB baseline setting in which, once the host current reaches a certain level (in the example of FIG. 5, approximately 1.2A at point 506), DSR 340 turns on with CB threshold voltage and gain parameter settings that are sufficient to maintain the host current below the 1.5A host current limit even when the maximum total 5V load of 2A is reached. In particular, at point 506 (about 1.2A host current), DSR current balancer 340 turns on and begins drawing current from the high voltage supply such that the host current decreases until point 508. From point 508 onwards the host current steadily increases (based on the CB threshold voltage and gain parameter settings) and approaches (but does not exceed) the host current limit when the maximum total low voltage supply load is reached.

The CB baseline setting of FIG. 5, while relatively simple and achieving the goal that the host current stay below the host current limit, has a drawback associated with the minimum current limit (minCurrentLimit$_{pk}$) required for turn on of DSR 340 of current balancer 300. When the current load is in the region of the minimum current limit of DSR 340, load variances may cause fluctuation between being above and being below the minimum current limit, thereby causing DSR 340 to switch between an enabled (on) state in which DSR 340 draws current, and a disabled (off) state in which DSR 340 draws no current.

Figure 6:
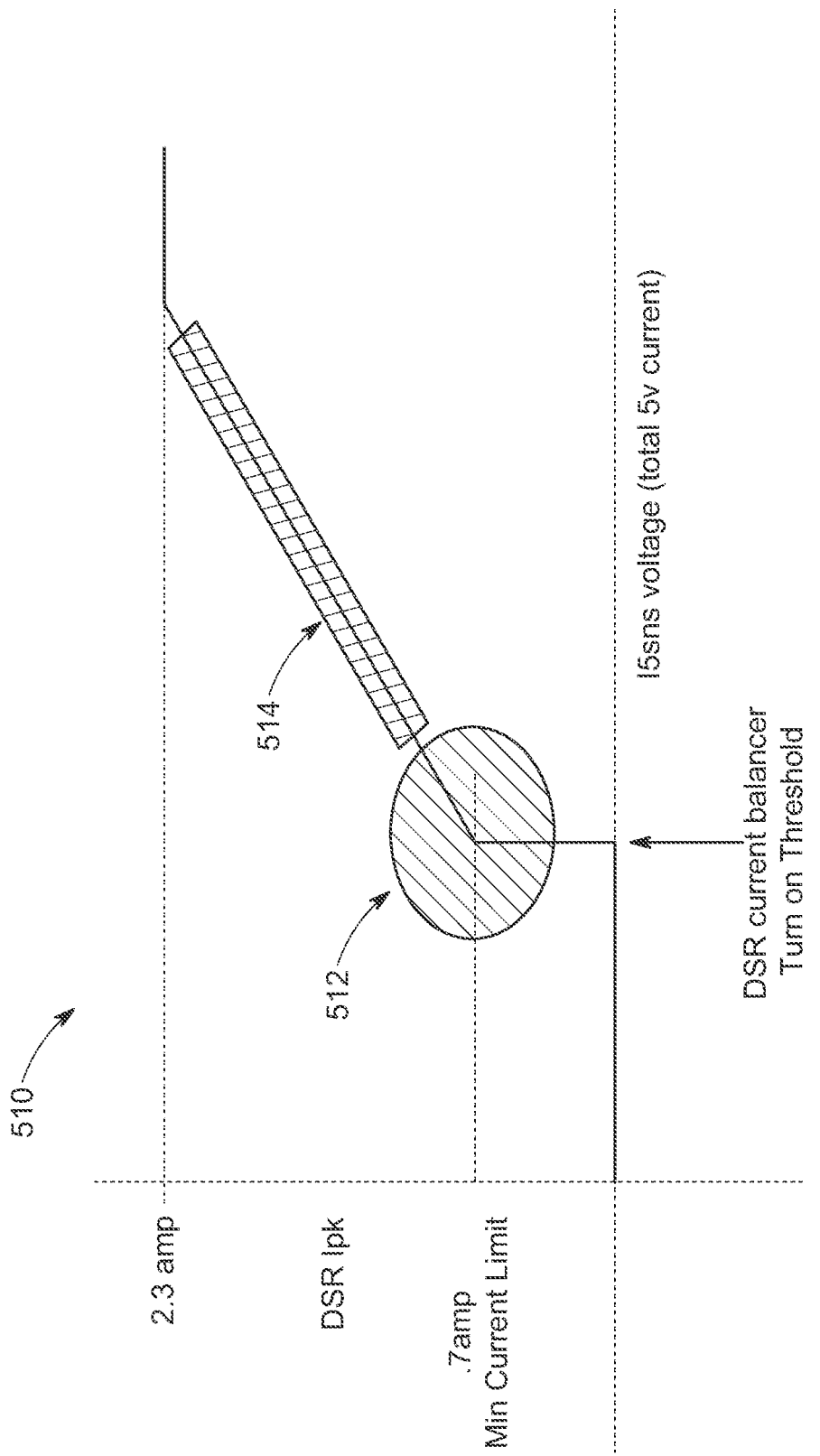
FIG. 6 is a graph plotting CB drive shut down regulator (DSR) peak current $I_{pk}$ (vertical axis) versus the total low voltage supply load (horizontal axis), in accordance with aspects of this disclosure.

This issue is conceptually illustrated in FIG. 6, which is a graph 510 plotting DSR peak current $I_{pk}$ (vertical axis) versus the total low voltage supply load (horizontal axis), in accordance with aspects of this disclosure. As can be seen in FIG. 6, the DSR current is zero until the DSR minimum current limit (minCurrentLimit$_{pk}$) is reached since DSR 340 is not enabled (turned on) until that limit is reached. Once the DSR minimum current limit is reached, the DSR peak current $I_{pk}$ abruptly jumps from zero to the DSR minimum current limit, which in one non-limiting example is about 0.7A. If any load variance or transient occurs that reduces the DSR current below the minimum turn on, DSR 340 turns off and DSR $I_{pk}$ drops back to zero. A region of discontinuity 512 is thereby created in which DSR 340 may abruptly and rapidly switch between on and off states, which in turn causes DSR $I_{pk}$ to switch abruptly and rapidly between zero and the minimum current limit. Once DSR $I_{pk}$ has increased beyond this discontinuous region 512, a continuous region 514 is reached where current balancer 300 is no longer subject to such abrupt changes and discontinuities.

Figure 7A:
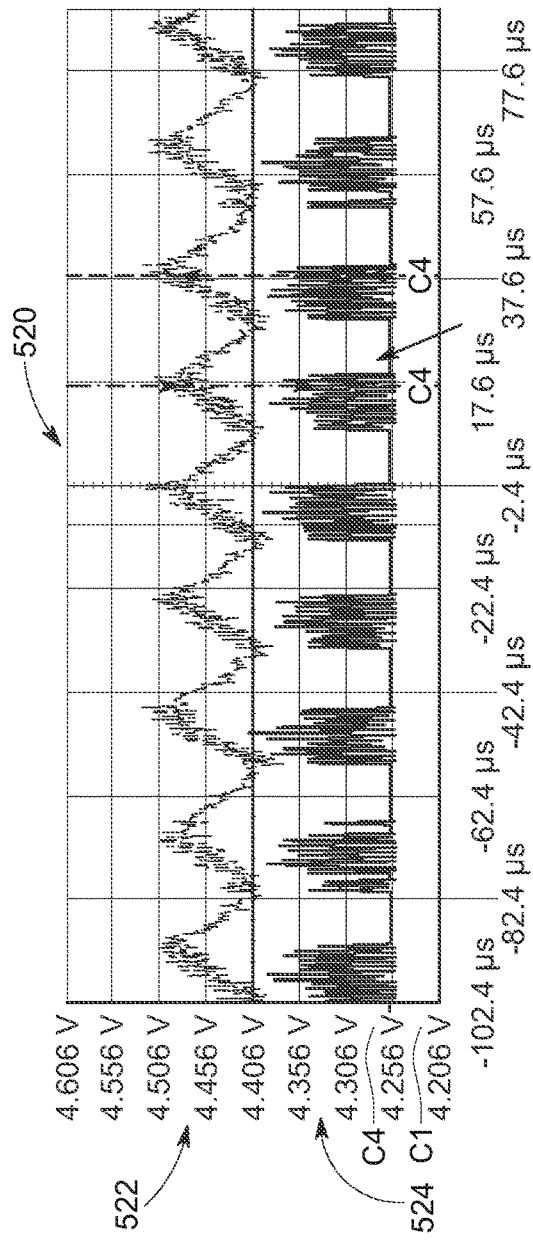
FIG. 7A is a graph plotting low supply voltage and DSR current (vertical axis) versus time (horizontal axis) in a discontinuous region, in accordance with aspects of this disclosure.

Operation of current balancer 300 in discontinuous region 512 of FIG. 6 creates a corresponding discontinuity or "ripple" in the low voltage (D5V) output of current balancer 300. This is illustrated in FIG. 7A, which is a graph 520 plotting the low supply voltage (D5V) at the output of current balancer 300 (top portion 522 of graph 520) and the DSR current through inductor 348 as translated to voltage (bottom portion 524 of graph 520) in discontinuous region 512, in accordance with aspects of this disclosure. In the non-limiting example of FIG. 7A, the host current limit is set as 1.5A; the CB threshold voltage parameter $I_{Threshold}$ is set as 420 mV, and the CB gain parameter Gain is set as 16. These parameter settings cause current balancer 300 to operate in discontinuous region 512 of FIG. 6, which consequently switches between on and off states, causing discontinuous current spikes in the DSR current (bottom region 524) and ripples in the low voltage (D5V) output of current balancer 300. In the non-limiting example of FIG. 7A, the ripple in the low voltage output has a magnitude of about 100 mV.

Figure 7B:
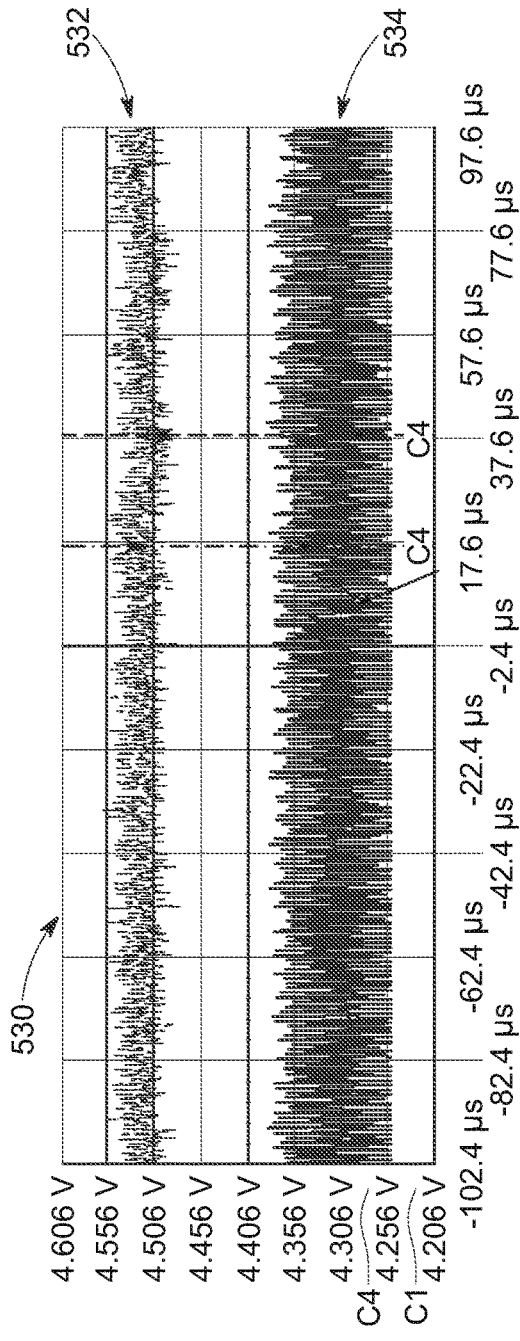
FIG. 7B is a graph plotting low supply voltage and DSR current (vertical axis) versus time (horizontal axis) in a continuous region, in accordance with aspects of this disclosure.

In continuous region 514 of FIG. 6, conversely, current balancer 300 operates free of such DSR current spikes and ripples in the D5V voltage. This is illustrated in FIG. 7B, which is a graph 530 plotting the low voltage (D5V) output of current balancer 300 (top portion 532 of graph 530) and DSR current as translated to voltage (bottom portion 534 of graph 530) in continuous region 514, in accordance with aspects of this disclosure. In the non-limiting example of FIG. 7B, the host current limit is set as 1.2A; the CB threshold voltage parameter $I_{Threshold}$ is set as 300 mV, and the CB gain parameter Gain is set as 8. These settings cause current balancer 300 to operate in continuous region 514 and consequently to remain in a steady and continuous enabled state with no DSR current spikes or D5V ripples, in contrast to discontinuous region 512.

Referring again to the diagram of current balancer 300 in FIG. 3, it can be seen that the D5V output capacitor(s) 356 are mounted in close proximity to rotational vibration (RV) sensor 360. RV sensor 360 is provided to sense various vibrational forces that may act on disk drive 15 so that such vibrational forces can be appropriately identified and dealt with. Such forces include, without limitation, rotational vibration caused by rotation of disks 16 of disk drive 15; "pop" forces in the plane perpendicular to disks 16 that may be caused by handling, disk movement, or accidents; and "shock" forces in the plane parallel to disks 16 that may come from disk drive 15 experiencing rapid acceleration or deceleration or being dropped. Due to the close proximity between output capacitor(s) 356 and RV sensor 360, the ripples in the D5V output voltage when current balancer 300 operates in the discontinuous region cause low frequency vibration of the D5V output capacitor(s) 356. This unintended capacitor vibration, in turn, is picked up by RV sensor 360. This unintended or "false" noise that is sensed by RV sensor 360 is difficult to distinguish from "real" rotational, pop, shock, etc. sources of vibration that RV sensor 360 is intended to detect.

To mitigate such unintended RV noise, in accordance with aspects of this disclosure, current balancer 300 should always or nearly always be operated in continuous region 514 and should not be operated in discontinuous region 512. That is, DSR 340 of current balancer 300 should not be turned on until continuous operation in continuous region 514 can be ensured. In accordance with this disclosure, so long as the host current $I_{H5V}$ drawn from the low voltage supply minus the CB threshold voltage parameter $I_{Threshold}$ is at least twice the minimum current limit peak value of current balancer 300 (minCurrentLimit$_{pk}$), or $I_{H5V}-I_{Threshold} \geq 2*$minCurrentLimit$_{pk}$, there is enough margin to always stay out of discontinuous region 512. Thus, where minCurrentLimit$_{pk}$=0.7A, $I_{H5V}-I_{Threshold} \geq 2*0.7$A peak, or $I_{H5V}-I_{Threshold}>1.4$A peak. In terms of a DC or average value rather than a peak value, $I_{H5V}-I_{Threshold}>0.7$A average should be satisfied before DSR 340 is turned on to ensure that current balancer 300 operates in continuous region 514.

In some non-limiting examples, as noted above, the minimum current limit (peak value) of current balancer 300 is about 0.7A. This minimum current limit value is merely exemplary, however, and this disclosure is not limited to a disk drive or current balancer having a specific minimum current limit value.

Once current balancer 300 is turned on, the host current $I_{H5V}$ is sampled on a frequent and periodic basis (every servo ID ("SID") or few SIDS as described below) by ADC 312, and the CB threshold voltage and gain parameters are adjusted by SoC 320 so that the host current level $I_{H5V}$ always satisfies this condition.

Figure 8:
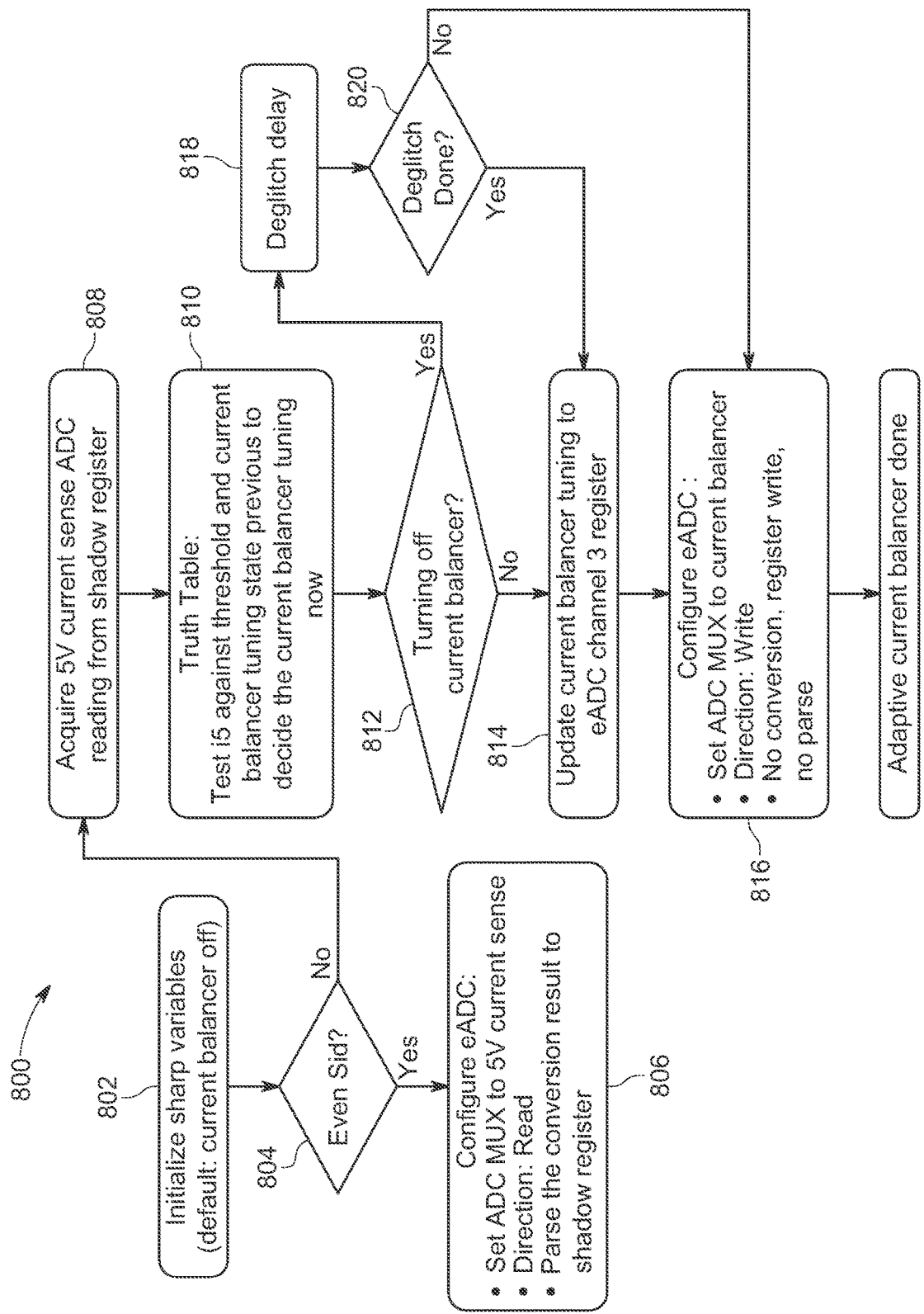
FIG. 8 is a flow diagram of a method for mitigating rotational vibration (RV) noise in a current balancer, in accordance with aspects of this disclosure.

FIG. 8 is a flow diagram of a method 800 for mitigating RV noise in current balancer 300, in accordance with aspects of this disclosure. Method 800 samples the host current ($I_{H5V}$) drawn from the low voltage supply such that DSR 340 of current balancer 300 is not turned on (enabled) until $I_{H5V}-I_{Threshold} \geq 2*$minCurrentLimit$_{pk}$, and thereafter controls the CB threshold voltage parameter such that $I_{H5V}-I_{Threshold} \geq 2*$minCurrentLimit$_{pk}$ continues to be satisfied. In step 802, the variables controlling operation of current balancer 300 are initialized (host current load limit, CB threshold voltage and gain parameters, etc.), and DSR 340 of current balancer 300 is set to a disabled or off state, which is its default state.

Figure 9:
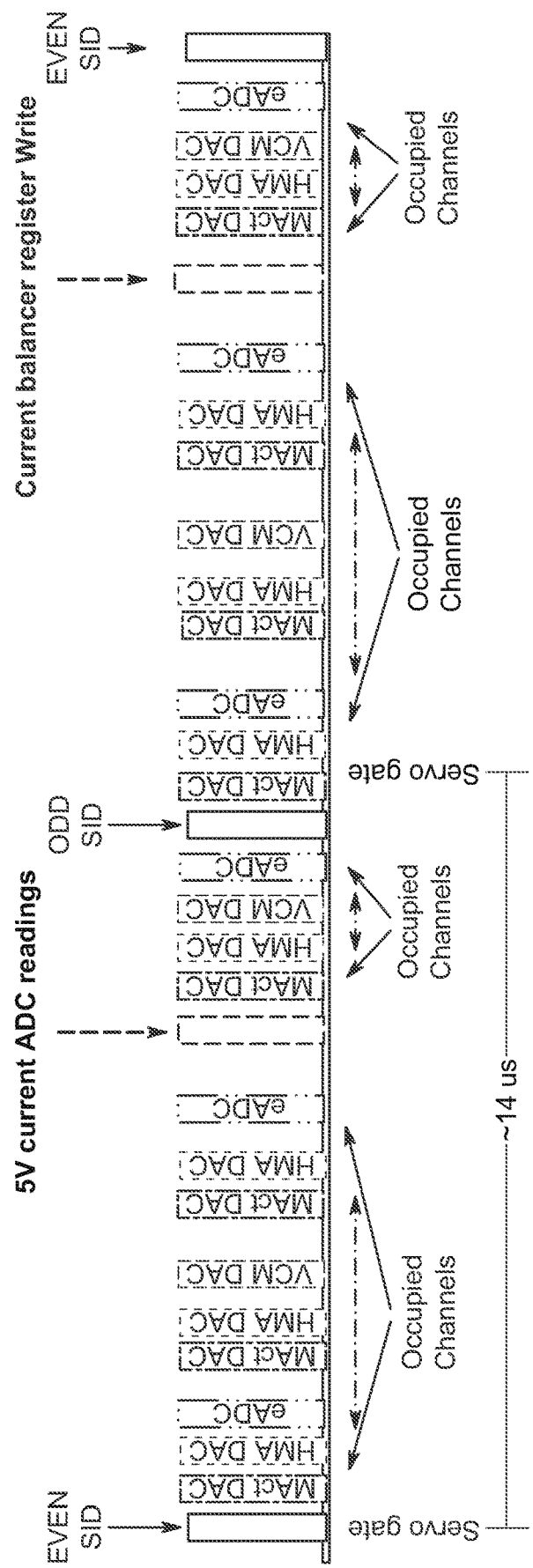
FIG. 9 is a conceptual diagram showing the relationship between servo IDs (SIDs) and ADC channels available for serial port transmissions, in accordance with aspects of this disclosure.

The host current $I_{H5V}$ is sampled by ADC 312 on a frequent and periodic basis. In some examples, sampling is carried out with reference to the servo ID ("SID") field, which is a field indicating the start of a new servo sector. As technology advances and the number of servo sectors present on a disk continues to increase, SID-to-SID time correspondingly decreases, which in turn reduces the number of serial port transmissions that can be made in each SID cycle by ADC 312. In one example, the SID-to-SID time between consecutive SIDs is only about 14 microseconds. The relationship between SIDs and ADC channels available for serial port transmissions is conceptually shown in FIG. 9. As can be seen, substantial ADC serial port traffic designated for other purposes already exists between SIDs (servo gates), indicated in FIG. 9 as "occupied channels". As a result, only one more ADC channel for serial port transmissions can comfortably be added between SIDs. This channel is alternated between transmitting the host current that is sampled by ADC 312 to SoC 320 (designated in FIG. 9 as "5V current ADC readings") and transmitting the CB threshold voltage and gain parameters as updated based on the sampled host current from SoC 320 to CB registers 316, designated in FIG. 9 as "Current balancer register write".

Referring again to FIG. 8, after initialization step 802, step 804 determines whether the current SID is an even number or odd number. If the current SID is an even number (step 804-YES), in step 806, ADC 312 is set to sample the host current $I_{H5V}$ ("5V current sense"), the sampled host current is read by SoC 320 via serial port 314 ("Direction: Read"), and the sampled host current read by SoC 320 (as converted to voltage) is parsed by SoC 320 to a shadow register in SoC 320. If the current SID is an odd number, i.e., not an even number (step 804-NO), SoC 320 acquires the most recently sampled host current $I_{H5V}$ value from the SoC shadow register (step 808). Next, in step 810, SoC 320 accesses a truth table to determine whether the tuning of current balancer 300 (i.e., off or on state and the settings of the CB threshold voltage and gain parameters) needs to be updated. Based on the most recently sampled value of host current $I_{H5V}$ and the currently tuned state of current balancer 300, the truth table indicates whether the tuning state of current balancer 300 should be maintained or updated (changed).

Figure 10:
FIG. 10 is a conceptual diagram of a truth table that is referenced by the method of FIG. 8 to determine whether the tuning of the current balancer should be updated, in accordance with aspects of this disclosure.
Figure 11:
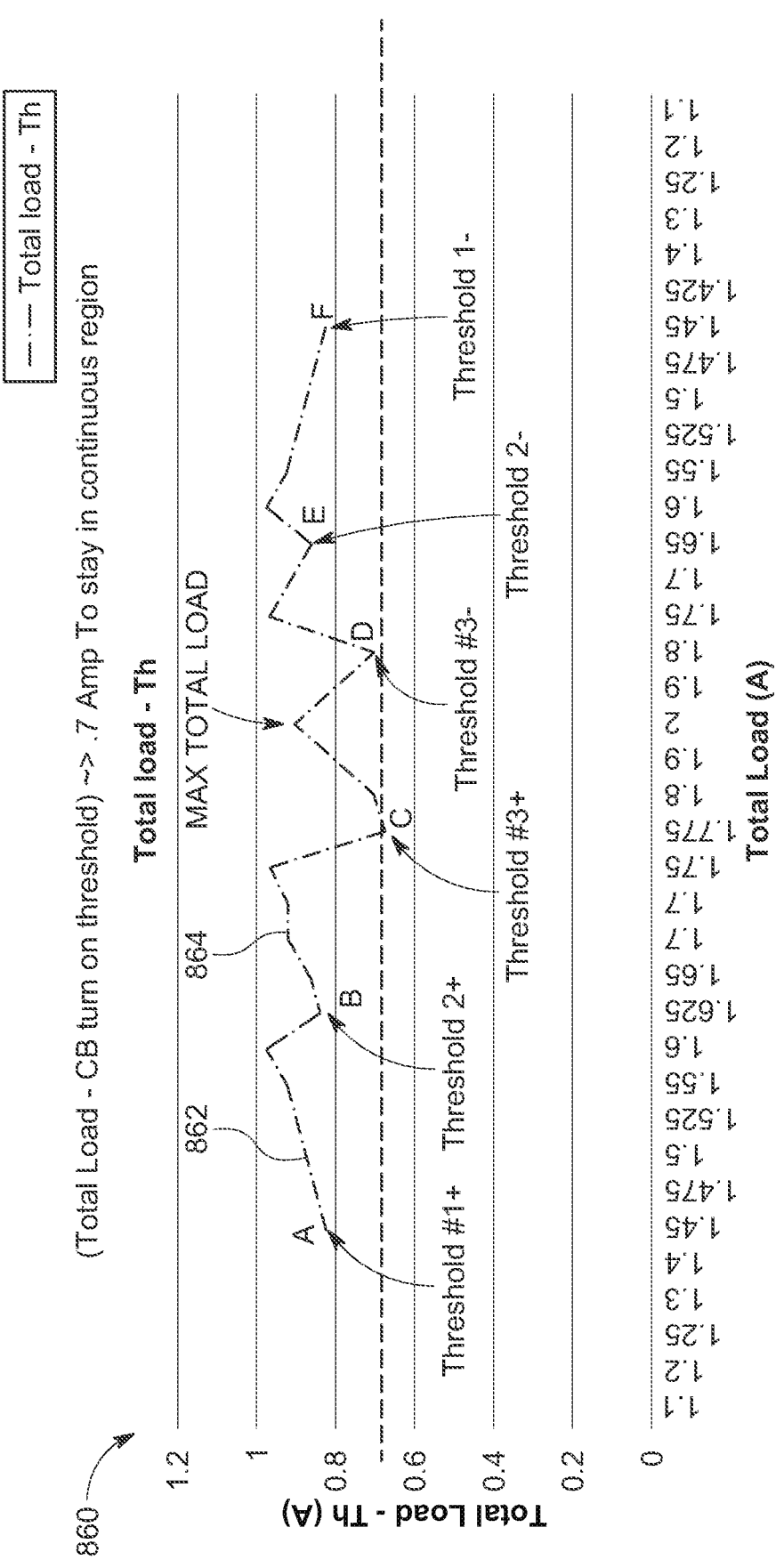
FIG. 11 is a graph plotting the difference between the total low voltage supply load and the CB threshold voltage parameter (vertical axis) versus the total low voltage supply load (horizontal axis), in accordance with aspects of this disclosure.
Figure 12:
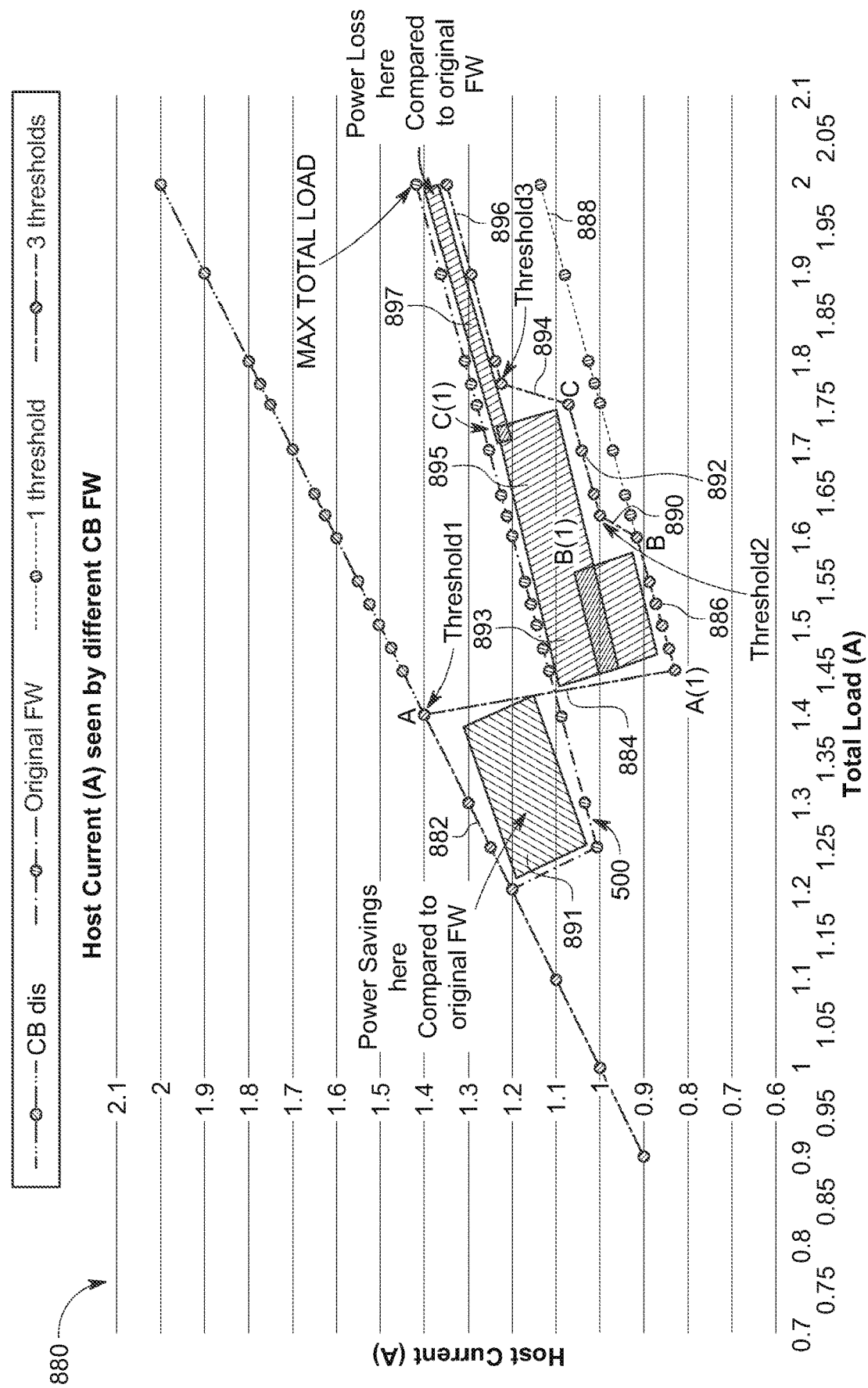
FIG. 12 is a is a graph plotting the host current (vertical axis) versus the total low voltage supply load (horizontal axis), in accordance with aspects of this disclosure.

Truth table 850 of FIG. 10 is one non-limiting example of a truth table that may be used by SoC 320 to determine whether the tuning of current balancer 300 should be updated, in accordance with aspects of this disclosure. FIGS. 11 and 12 are graphs showing the behavior of current balancer 300 as SoC 320 progresses through truth table 850. In particular, FIG. 11 is a graph plotting the difference between the total low voltage supply load and the CB threshold voltage parameter (vertical axis) versus the total low voltage supply load (horizontal axis), and FIG. 12 is a is a graph plotting the host current (vertical axis) versus the total low voltage supply load (horizontal axis), in accordance with aspects of this disclosure.

Until the difference between the host current drawn from the low voltage supply and the CB threshold voltage is at least twice the minimum current limit of the current balancer, or $I_{H5V}-I_{Threshold} \geq 2*\text{minCurrentLimit}_{pk}$, current balancer 300 remains disabled (turned off). This disabled state is indicated as state "0x8720" in truth table 850, and corresponds to plot line 882 in FIG. 12, where the host current equals the total low voltage supply load since current balancer 300 has not been turned on. At point A in FIGS. 11 and 12, the condition $I_{H5V}-I_{threshold} \geq 2*\text{minCurrentLimit}_{pk}$ is satisfied (condition A in truth table 850), indicating that the tuning state of current balancer 300 should be changed. In particular, current balancer 300 should be enabled, and the CB threshold voltage and gain parameters should be set as provided in truth table 850 (state "0x8120"). Updated threshold voltage and gain parameters are provided by SoC 320 to ADC 312 in step 814 so long as those updated parameters do not indicate that current balancer 300 should be disabled (step 812-NO). If the updated parameters indicate that current balancer 300 is to be disabled (step 812-YES), the method proceeds to a deglitch delay step 818 that will be explained later in this description.

For now, if the updated parameters do not indicate that current balancer 300 should be disabled, SoC 320 provides the updated "state 8120" parameters to ADC 312 in step 814, and those updated parameters are written to CB registers 316 in step 816. This causes current balancer 300 to turn on, which in turn causes the host current to drop due to the minimum turn on current that DSR 340 of current balancer 300 pulls from the high voltage supply (see plot line 884 of FIG. 12). At point A(1) of FIG. 12, the host current has been pulled down and begins to increase again (plot line 886) by application of the new CB threshold voltage and gain parameters.

Current balancer 300 could continue to operate without further state or threshold changes from point A(1) onwards, which would correspond to plot line 888 in FIG. 12. However, as the ever-increasing low voltage supply load causes corresponding increase in the difference between the low voltage supply load and CB threshold voltage (plot line 862 of FIG. 11), another CB threshold voltage parameter change can eventually be applied to ramp up the amount of host current and reduce the power consumption of current balancer 300. This occurs at point B of FIGS. 11 and 12 and corresponds to condition B of truth table 850. Here, once the host current has reached a certain level (as determined in step 810), the CB threshold voltage parameter is updated to "state 8320" and written to CB register 316. The host current ramps up relative to the total low voltage supply load by application of the updated threshold voltage (plot line 890 of FIG. 12) and eventually levels off at point B(1) and into plot line 892.

Similarly, when the difference between load and threshold has again increased through plot line 864 of FIG. 11, another CB threshold voltage parameter change is applied to again ramp up the amount of host current and further reduce the power consumption of current balancer 300. At point C of FIGS. 11 and 12, which corresponds to condition C of truth table 850 where the host current has reached a certain level, the CB threshold voltage parameter is updated to "state 8420" and written to CB registers 316. The host current again ramps up relative to the total load by application of the updated threshold voltage (plot line 894 of FIG. 12) and eventually levels off at point C(1) and into plot line 896, where the host current is only slightly below the baseline setting 500 (as discussed with reference to FIG. 5).

As can be seen by power loss regions 893, 895 and 897 of FIG. 12, mitigation of RV noise by application of method 800 does cause power loss relative to the baseline configuration 500 due to the increased amount of DSR current that current balancer 300 pulls in. However, method 800 also gains power savings in region 891 relative to baseline setting 500 by virtue of the later enabling (turn on) of DSR 340 at a higher host current. And, as can be seen by comparing power loss regions 893, 895 and 897, use of multiple threshold voltages mitigates power loss compared to a configuration in which only one threshold voltage is applied. That is, power loss region 893 is decreased in size relative to power loss region 895 upon application of a second threshold voltage, and power loss region 897 is further decreased in size relative to power loss region 895 upon application of a third threshold voltage.

FIG. 11 also illustrates the use of threshold voltage changes as total load is decreasing, rather than increasing. When the total low voltage supply load has decreased from the maximum load to a point D where the difference between the total low voltage supply load and the threshold voltage approaches the minimum current limit (about 0.7A peak) of DSR 340 of current balancer 300, which corresponds to condition D of truth table 850, the threshold parameters are changed back to "state 8320" and are similarly changed back to "state 8120" when point E/condition E is reached. When the host current has reached a sufficiently low level that point F/condition F is reached and following completion (step 820-YES) of deglitching delay 818, CB registers 816 are updated to "state 8720", causing turn off of DSR 340 of current balancer 300 and completion of method 800.

Deglitching delay step 818 introduces a requirement that there be a minimum number of consecutive host current samples below the turn off threshold before CB registers 816 are written to "state 8720" to cause disablement (turn off) of current balancer 300. That is, a minimum number of SIDs must pass in which the host current remains below the turn off threshold. This is necessary to avoid fluctuation and on/off switching around the firmware turn off and turn on thresholds in a similar fashion to that which occurs around the minimum current limit of the current balancer, which could lead to similar D5V ripple and RV sensor noise.

Figure 13:
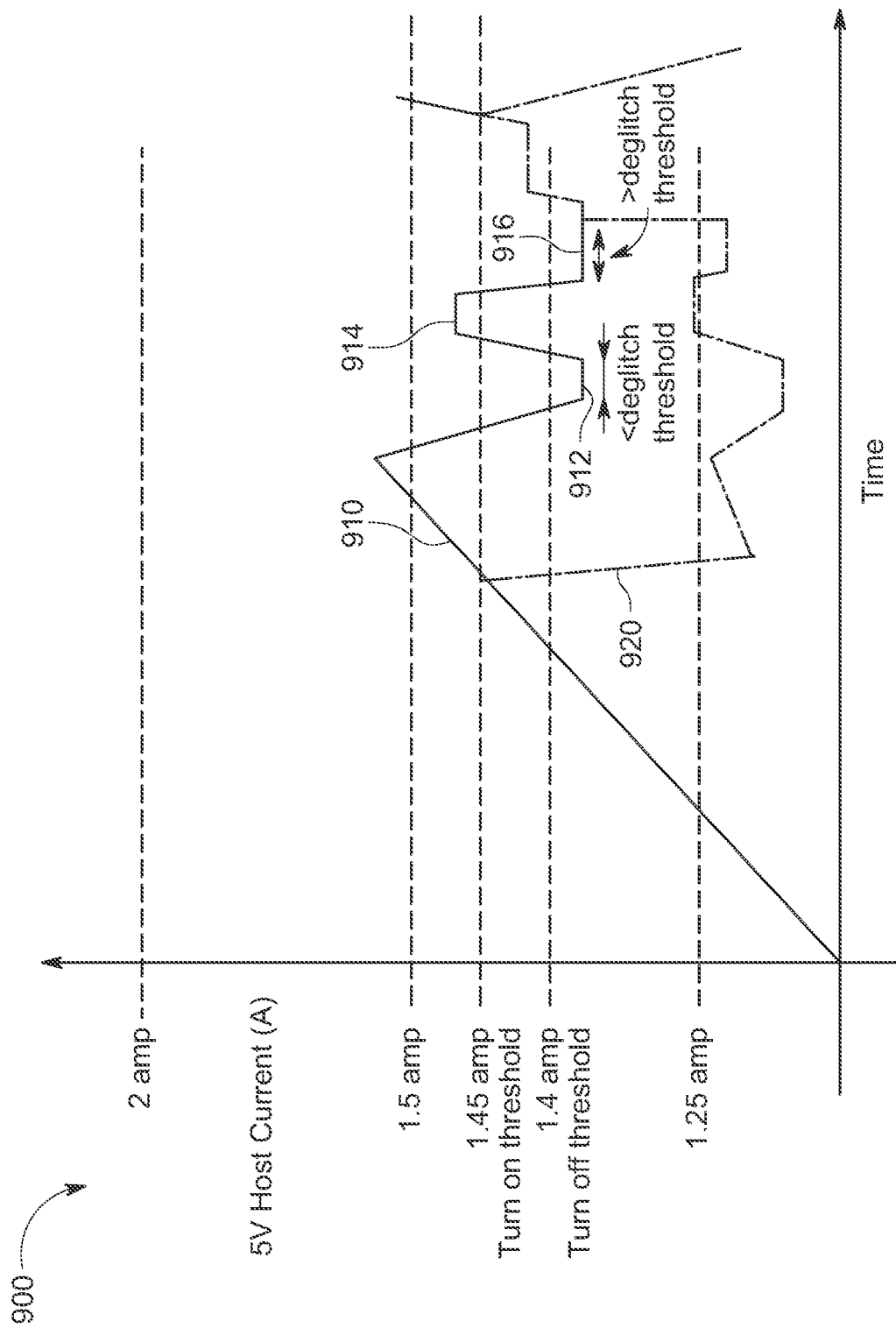
FIG. 13 is a graph plotting host current versus time to illustrate the deglitching delay step of the noise mitigating method of FIG. 8, in accordance with aspects of this disclosure.

FIG. 13 is a graph 900 plotting total low voltage supply load (plot line 910) and host current (plot line 920) versus time to illustrate deglitching delay step 818 of method 800, in accordance with aspects of this disclosure. In the non-limiting example of FIG. 13, the host current turn on threshold for current balancer is 1.45A, and the host current turn off threshold is 1.4A. These values are of course merely exemplary and other suitable values may be substituted. Even though the total load drops below the turn off threshold of 1.4A in region 912, it fluctuates and rises to be over the turn on threshold of 1.45A in region 914, and then drops below the turn off threshold again in region 916. However, because region 912 is of shorter duration than the deglitching delay (i.e., not enough consecutive samples occurred where the host current remained below the turn off threshold), the current balancer is not switched off only to be switched on again in region 914 and then off again in region 916 and possibly causing D5V ripple and RV noise. Instead, current balancer 300 remains on throughout regions 912 and 914 and is not switched off until region 916, which is of longer duration than the deglitching delay.

Thus, by the deglitching delay of step 818, method 800 mitigates RV noise when current balancer 300 is switching from an on to an off state, as well as when it is switching from an off to an on state. In this regard, the inventors have found that with a deglitching delay of around 5000 SIDs, substantially all RV noise is eliminated. However, a deglitching delay of this length does increase power loss by longer operation of current balancer 300. A shorter deglitching delay of 1000 SIDs, conversely, achieves power savings relative to the longer deglitching delay of 500 SIDs, but has a trade off in that RV noise is reduced but not completely eliminated.

Figure 14B:
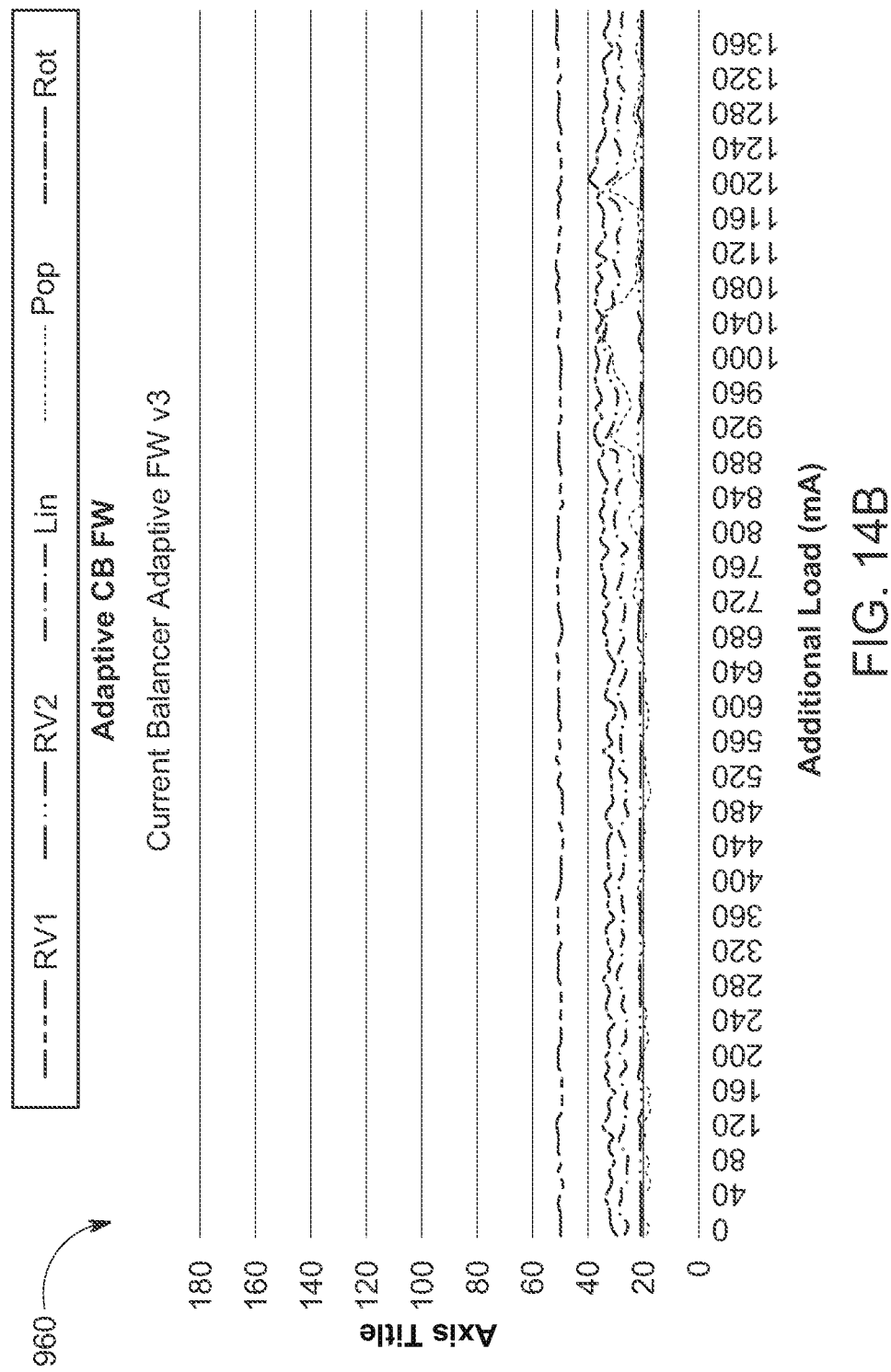
FIG. 14B is a graph plotting RV noise versus load for an adaptive current balancer firmware configuration, in accordance with aspects of this disclosure.

FIGS. 14A and 14B illustrate the dramatic reduction in RV noise that occurs by use of method 800, according to aspects of this disclosure. FIG. 14A is a graph 950 plotting RV noise from various sources versus load for the baseline setting of FIG. 5, and FIG. 14B is a graph 960 plotting RV noise from various sources versus load for the RV noise mitigation method 800 of FIG. 8. The baseline setting of FIG. 14A includes no RV noise reduction measures and consequently sees a large spike in RV noise between about 400 mA and about 900 mA of load. The noise mitigation procedure of method 800 (FIG. 14B), by contrast, completely eliminates this extraneous source of noise.

Any suitable control circuitry may be employed to implement the flow diagrams in the above examples. The term "control circuitry" should be understood to include, without limitation, any or all of control circuitry 22, current balancer 300, SoC 320, DSR 340 and PLSI circuit 360. For example, the control circuitry may be implemented in a suitable integrated circuit(s), in a read channel integrated circuit, or in a component separate from the read channel, such as a data storage controller. Some operations described above may be performed by a read channel and others by a data storage controller. The control circuitry may be wholly or partly implemented in various portions of an RF signal source architecture.

In some examples, the control circuitry may comprise a microprocessor executing instructions operable to perform the flow diagrams described herein (e.g., FIGS. 2C and 8). The instructions may be stored in any computer-readable medium. In some examples, the instructions may be stored on a non-volatile semiconductor memory device, component, or system external to the microprocessor, or integrated with the microprocessor in an SoC. In some examples, the instructions are stored on a disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the flow diagram blocks may be implemented using digital circuitry or a combination of analog and digital circuitry.

In various examples, one or more processing devices may comprise the control circuitry described herein, and/or may perform one or more of the functions of the control circuitry described herein. The control circuitry, or other processing devices performing one or more of the functions of the control circuitry described herein, may be abstracted away from being physically proximate to the disks and disk surfaces. The control circuitry, or other processing devices performing functions of the control circuitry described herein, may be part of or proximate to a rack of products or a unitary product comprising multiple data storage devices, or may be part of or proximate to one or more physical or virtual servers, or may be part of or proximate to one or more local area or storage area networks, or may be part of or proximate to a data center, or may be hosted in one or more cloud services.

In various examples, disk drive 15 may be a magnetic disk drive, an optical disk drive, a hybrid disk drive, or another type of disk drive. In addition, electronic devices such as computing devices, data server devices, media content storage devices, or other devices or systems may comprise the storage media and/or control circuitry described above.

The various features and processes described above may be used independently or may be combined in various ways. All possible combinations and sub-combinations fall within the scope of this disclosure. In addition, certain method or process blocks may be omitted or added in some implementations. The methods and processes described herein are not limited to any particular sequence and may be performed in sequences other than those described. Multiple tasks or events may be combined in a single block or state and may be performed in serial, in parallel, or in another manner.

While certain embodiments are described herein, these embodiments are presented by way of example only, and do not limit the scope of this disclosure. Nothing in this description implies that any particular feature, characteristic, step, module, or block is necessary or indispensable. Various omissions, substitutions, and changes in the form of the methods and systems described herein may be made without departing from the spirit and scope of this disclosure.

Some or all of any of method 80 and/or method 800 may be performed by or embodied in hardware, and/or performed or executed by a controller, a CPU, a field-programmable gate array (FPGA), an SoC, a multi-processor system on chip (MPSoC), which may include both a CPU and an FPGA, and other elements together in one integrated SoC, or by any other processing or computing device processing executable instructions.

Data storage systems, devices, and methods are thus shown and described herein, in various foundational aspects and in various selected illustrative applications, architectures, and techniques. Persons skilled in the relevant fields of art will be well-equipped by this disclosure and by the claims set forth below with an understanding and an informed reduction to practice of a wide array of further applications, architectures, techniques, and methods.

What is claimed is:

1. A data storage device comprising:
a disk;
a head configured to read data from and write data to the disk; and
a current balancer configured to:
receive a first voltage supply having a load limit;
receive a second voltage supply;
sense a first current drawn from the first voltage supply;
sample the first current, wherein sampling the first current comprises sampling the sensed first current by an analog-to-digital converter (ADC);
read the sampled first current by a system-on-a-chip (SoC) from the ADC;

write a current balancer threshold parameter and a current balancer gain parameter to a current balancer register;

maintain a difference between the first current and the current balancer threshold parameter, wherein the difference is based on a minimum peak current amount required to turn on the current balancer; and draw a second current from the second voltage supply to satisfy a part of a total load on the first voltage supply that exceeds the load limit.

2. The data storage device of claim 1, wherein the difference is at least a scalar multiple of the minimum peak current amount.

3. The data storage device of claim 1, wherein the difference is at least twice the minimum peak current amount.

4. The data storage device of claim 1, further comprising:
a circuit protection device comprising a current sensor;
wherein sensing the first current comprises:
monitoring, by the current balancer, the first current flowing through the circuit protection device using the current sensor; and
wherein the ADC is configured to sample the first current sensed by the current sensor; and
wherein the SoC is configured to receive the sampled first current via a serial port from the ADC, and wherein the SoC is further configured to control the current balancer based on the sampled first current.

5. The data storage device of claim 4, wherein the SoC is further configured to:
generate, based on the sampled first current received from the ADC, the current balancer threshold parameter and the current balancer gain parameter; and
wherein the current balancer threshold parameter and the current balancer gain parameter are written to the current balancer register by the SoC via the serial port.

6. The data storage device of claim 5, wherein the SoC is further configured to enable the current balancer when the difference between the first current and the current balancer threshold parameter is at least twice the minimum peak current amount required to turn on the current balancer.

7. The data storage device of claim 6, wherein the current balancer further comprises registers that are coupled to the SoC, and wherein the registers are configured to receive and store the current balancer threshold parameter and the current balancer gain parameter from the SoC.

8. The data storage device of claim 7, wherein the SoC is further configured to:
read the sampled first current from the ADC via the serial port following a first servo identification field (SID); and
write the current balancer threshold parameter and current balancer gain parameter to the registers following a second SID that is consecutive to the first SID.

9. The data storage device of claim 7, wherein the SoC is further configured to disable the current balancer only after the sampled first current falls below a turn off threshold current of the current balancer, and only after the sampled first current remains below the turn off threshold current for a predetermined deglitch delay.

10. The data storage device of claim 9, wherein the predetermined deglitch delay comprises 5000 SIDs.

11. The data storage device of claim 9, wherein the predetermined deglitch delay comprises 1000 SIDs.

12. The data storage device of claim 6, wherein the ADC is further configured to periodically update the sampled first current that is provided to the SoC, and wherein the SoC is further configured to periodically update the current balancer threshold parameter and the current balancer gain parameter.

13. The data storage device of claim 6, wherein:
the first current is represented by $I_{H5V}$;
the current balancer threshold parameter is represented by $I_{Threshold}$;
the minimum peak current amount required to turn on the current balancer is represented by $minCurrentLimit_{pk}$;
DSR $I_{pk}$ is the second current drawn by the current balancer from the second voltage supply;
Gain is the current balancer gain parameter; and
the second current is represented by:

$$\text{DSR } I_{pk} = ((I_{H5V} - I_{Threshold}) \times \text{Gain}) + \text{minCurrentLimit}_{pk}.$$

14. The data storage device of claim 1, further comprising:
a circuit protection device that is configured to be coupled to the first voltage supply and the second voltage supply, wherein the circuit protection device comprises a current sensor; and
wherein sensing the first current comprises:
monitoring, by the current balancer, the first current flowing through the circuit protection device using the current sensor.

15. A method for mitigating rotational vibration (RV) noise in a current balancer of a data storage device configured to receive a first voltage supply having a load limit and a second voltage supply, the method comprising:
sensing a first current drawn from the first voltage supply;
sampling the first current, wherein sampling the first current comprises sampling the sensed first current by an analog-to-digital converter (ADC);
reading the sampled first current by a system-on-a-chip (SoC) from the ADC;
writing a current balancer threshold parameter and a current balancer gain parameter to a current balancer register;
maintaining a difference between the first current and the current balancer threshold parameter to be at least twice a minimum peak current amount required to turn on the current balancer; and
drawing a second current from the second voltage supply to satisfy a part of a total load on the first voltage supply that exceeds the load limit.

16. The method of claim 15, wherein:
sensing the first current comprises sensing the first current by a current sensor in a circuit protection device;
the SoC reads the sampled first current via a serial port from the ADC;
the SoC writes the current balancer threshold parameter and the current balancer gain parameter via the serial port to the current balancer register; and
the difference between the first current and the current balancer threshold parameter is a scalar multiple of the minimum peak current amount.

17. The method of claim 16, further comprising:
enabling the current balancer when the difference between the first current and the current balancer threshold parameter is at least twice the minimum peak current;
wherein:
the first current is represented by $I_{H5V}$;
the current balancer threshold parameter is represented by $I_{Threshold}$;
the minimum peak current amount required to turn on the current balancer is represented by $minCurrentLimit_{pk}$;

DSR $I_{pk}$ is the second current drawn by the current balancer from the second voltage supply;

Gain is the current balancer gain parameter; and the second current is represented by:

$$\text{DSR Limit}_{pk} = I_{pk} = ((I_{HSV} - I_{Threshold}) \times \text{Gain}) + \text{minCurrent}_{pk}.$$

18. The method of claim 17, further comprising:

disabling the current balancer when the sampled first current remains below a turn off threshold of the current balancer for a predetermined deglitch delay.

19. The method of claim 16, further comprising:

reading the sampled first current by the SoC via the serial port following a first servo identification field (SID); and writing the current balancer threshold parameter and the current balancer gain parameter via the serial port following a second SID that is consecutive to the first SID.

20. One or more processing devices for mitigating rotational vibration (RV) noise in a data storage device, the one or more processing devices comprising, individually or in combination:

a current balancer;

means for receiving a first voltage supply having a load limit;

means for receiving a second voltage supply;

means for sensing a first current by a current sensor in a circuit protection device;

means for sampling the first current drawn from the first voltage supply, wherein sampling the first current comprises sampling the sensed first current by an analog-to-digital converter (ADC);

means for reading the sampled first current by a system-on-a-chip (SoC) via a serial port from the ADC;

means for maintaining a difference between the first current and a current balancer threshold parameter, wherein the difference is at least twice a minimum peak current amount required to turn on the current balancer;

means for writing the current balancer threshold parameter and a current balancer gain parameter by the SoC via the serial port from the ADC; and means for drawing a second current from the second voltage supply to satisfy a part of a total first voltage supply load that exceeds the load limit.

21. The one or more processing devices of claim 20, further comprising, individually or in combination:

means for enabling the current balancer only when the difference between the first current and the current balancer threshold parameter is at least twice the minimum peak current amount.

22. The one or more processing devices of claim 21, further comprising, individually or in combination:

means for disabling the current balancer when the sampled first current remains below a turn off threshold current of the current balancer for a predetermined deglitch delay.

* * * * *